United States Patent
Furlan et al.

(12) 
(10) Patent No.: US 6,466,254 B1
(45) Date of Patent: Oct. 15, 2002

(54) METHOD AND APPARATUS FOR ELECTRONICALLY DISTRIBUTING MOTION PANORAMIC IMAGES

(75) Inventors: John L. Warpakowski Furlan, Bellmont, CA (US); Derek Fluker, San Jose, CA (US)

(73) Assignee: Be Here Corporation, Pleasanton, CA (US)

(*) Notice: Subject to any disclaimer, the term of this patent is extended or adjusted under 35 U.S.C. 154(b) by 62 days.

(21) Appl. No.: 09/589,645

(22) Filed: Jun. 7, 2000

Related U.S. Application Data

(63) Continuation-in-part of application No. 09/131,186, filed on Aug. 7, 1998, which is a continuation-in-part of application No. 09/344,528, filed on Jun. 24, 1999, now Pat. No. 6,219,089, which is a continuation of application No. 08/852,920, filed on May 8, 1997, now Pat. No. 6,043,837.

(51) Int. Cl.[7] ................................................. H04N 7/18
(52) U.S. Cl. .......................................... 348/36; 348/39
(58) Field of Search ..................................... 348/36–60

(56) References Cited

U.S. PATENT DOCUMENTS

| | | |
|---|---|---|
| 2,146,662 A | 2/1939 | Van Albada |
| 2,244,235 A | 6/1941 | Ayres |
| 2,304,434 A | 12/1942 | Ayres |
| 2,628,529 A | 2/1953 | Braymer |
| 2,654,286 A | 10/1953 | Cesar |
| 3,203,328 A | 8/1965 | Brueggeman |
| 3,205,777 A | 9/1965 | Benner |
| 3,229,576 A | 1/1966 | Rees |
| 3,692,934 A | 9/1972 | Herndon |
| 3,723,805 A | 3/1973 | Scarpino et al. |
| 3,785,715 A | 1/1974 | Mecklenborg |
| 3,832,046 A | 8/1974 | Mecklenborg |
| 3,846,809 A | 11/1974 | Pinzone et al. |
| 3,872,238 A | 3/1975 | Herndon |
| 3,934,259 A | 1/1976 | Krider |
| 3,998,532 A | 12/1976 | Dykes |
| 4,012,126 A | 3/1977 | Rosendahl et al. |
| 4,017,145 A | 4/1977 | Jerie |

(List continued on next page.)

FOREIGN PATENT DOCUMENTS

| | | |
|---|---|---|
| FR | 1234341 | 5/1960 |
| GB | 2 221 118 A | 1/1990 |
| GB | 2289820 | 11/1995 |
| JP | HEI 2-127877 | 11/1988 |

OTHER PUBLICATIONS

Supplemental Information Disclosure Statement in re: the Application of Steven D. Zimmerman, et al. Application No. 08/662,410; 08 Pages including PTO 1449 Form citing 19 references. Application No. 08/662,410; Filed Jul. 12, 1996. Filed: Jul. 12, 1996.

(List continued on next page.)

*Primary Examiner*—Andy Rao
(74) *Attorney, Agent, or Firm*—Daniel B. Curtis

(57) ABSTRACT

This patent discloses an electronic image distribution apparatus for distributing motion panoramic images. The main portion of the apparatus is a motion panoramic image server that has a source of motion panoramic images. The source of panoramic image frames may be a motion panoramic image playback device or a connection to a motion panoramic camera system. The motion panoramic image server transforms the panoramic image frames into an intermediate format that is more conducive for electronic transmission. In particular, portions of the panoramic image are encoded at a higher quality as compared to other portions of the panoramic image. A client computer obtains information about the encoding and subscribes to one or more tiles depending on the viewpoint of interest. The client computer receives and presents the data in these tiles. In addition, the patent discloses how to adjust the subscription based on the actual and/or predicted pan operations to obtain a quality presentation.

80 Claims, 28 Drawing Sheets

U.S. PATENT DOCUMENTS

| | | |
|---|---|---|
| 4,038,670 A | 7/1977 | Seitz |
| 4,058,831 A | 11/1977 | Smith |
| 4,078,860 A | 3/1978 | Globus et al. |
| 4,157,218 A | 6/1979 | Gordon et al. |
| 4,190,866 A | 2/1980 | Lukner |
| 4,241,985 A | 12/1980 | Globus et al. |
| D263,716 S | 4/1982 | Globus et al. |
| 4,326,775 A | 4/1982 | King |
| 4,395,093 A | 7/1983 | Rosendahl et al. |
| 4,429,957 A | 2/1984 | King |
| 4,463,380 A | 7/1984 | Hooks, Jr. |
| 4,484,801 A | 11/1984 | Cox |
| 4,518,898 A | 5/1985 | Tarnowski et al. |
| 4,549,208 A | 10/1985 | Kamejima et al. |
| 4,561,733 A | 12/1985 | Kreischer |
| 4,566,763 A | 1/1986 | Greguss |
| 4,578,682 A | 3/1986 | Hooper et al. |
| 4,593,982 A | 6/1986 | Rosset |
| 4,602,857 A | 7/1986 | Woltz et al. |
| 4,656,506 A | 4/1987 | Ritchey |
| 4,661,855 A | 4/1987 | Gulck |
| 4,670,648 A | 6/1987 | Hall et al. |
| 4,728,839 A | 3/1988 | Coughlan et al. |
| 4,736,436 A | 4/1988 | Yasukawa et al. |
| 4,742,390 A | 5/1988 | Francke et al. |
| 4,751,660 A | 6/1988 | Hedley |
| 4,754,269 A | 6/1988 | Kishi et al. |
| 4,761,641 A | 8/1988 | Schreiber |
| 4,772,942 A | 9/1988 | Tuck |
| 4,797,942 A | 1/1989 | Burt et al. |
| 4,807,158 A | 2/1989 | Blanton et al. |
| 4,835,532 A | 5/1989 | Fant |
| 4,858,002 A | 8/1989 | Zobel |
| 4,858,149 A | 8/1989 | Quarendon |
| 4,864,335 A | 9/1989 | Corrales |
| 4,868,682 A | 9/1989 | Shimizu et al. |
| 4,899,293 A | 2/1990 | Dawson et al. |
| 4,901,140 A | 2/1990 | Lang et al. |
| 4,907,084 A | 3/1990 | Nagafusa |
| 4,908,874 A | 3/1990 | Gabriel |
| 4,918,473 A | 4/1990 | Blackshear |
| 4,924,094 A | 5/1990 | Moore |
| 4,943,821 A | 7/1990 | Gelphman et al. |
| 4,943,851 A | 7/1990 | Lang et al. |
| 4,945,367 A | 7/1990 | Blackshear |
| 4,965,844 A | 10/1990 | Oka et al. |
| D312,263 S | 11/1990 | Charles |
| 4,974,072 A | 11/1990 | Hasegawa |
| 4,985,762 A | 1/1991 | Smith |
| 4,991,020 A | 2/1991 | Zwirn |
| 5,005,083 A | 4/1991 | Grage et al. |
| 5,020,114 A | 5/1991 | Fujioka et al. |
| 5,021,813 A | 6/1991 | Corrales |
| 5,023,725 A | 6/1991 | McCutchen |
| 5,038,225 A | 8/1991 | Maeshima |
| 5,040,055 A | 8/1991 | Smith |
| 5,048,102 A | 9/1991 | Tararine |
| 5,067,019 A | 11/1991 | Juday et al. |
| 5,068,735 A | 11/1991 | Tuchiya et al. |
| 5,077,609 A | 12/1991 | Manephe |
| 5,083,389 A | 1/1992 | Alperin |
| 5,097,325 A | 3/1992 | Dill |
| 5,115,266 A | 5/1992 | Troje |
| 5,130,794 A | 7/1992 | Ritchey |
| 5,142,354 A | 8/1992 | Suzuki et al. |
| 5,153,716 A | 10/1992 | Smith |
| 5,157,491 A | 10/1992 | Kassatly |
| 5,166,878 A | 11/1992 | Poelstra |
| 5,173,948 A | 12/1992 | Blackham et al. |
| 5,175,808 A | 12/1992 | Sayre |
| 5,185,667 A | 2/1993 | Zimmermann |
| 5,187,571 A | 2/1993 | Braun et al. |
| 5,189,528 A | 2/1993 | Takashima et al. |
| 5,200,818 A | 4/1993 | Neta et al. |
| 5,231,673 A | 7/1993 | Elenga |
| 5,259,584 A | 11/1993 | Wainwright |
| 5,262,852 A | 11/1993 | Eouzan et al. |
| 5,262,867 A | 11/1993 | Kojima |
| 5,280,540 A | 1/1994 | Addeo et al. |
| 5,289,312 A | 2/1994 | Hashimoto et al. |
| 5,305,035 A | 4/1994 | Schonherr et al. |
| 5,311,572 A | 5/1994 | Freides et al. |
| 5,313,306 A | 5/1994 | Kuban et al. |
| 5,315,331 A | 5/1994 | Ohshita |
| 5,341,218 A | 8/1994 | Kaneko et al. |
| 5,359,363 A | 10/1994 | Kuban et al. |
| 5,384,588 A | 1/1995 | Martin et al. |
| 5,396,583 A | 3/1995 | Chen et al. |
| 5,422,987 A | 6/1995 | Yamada |
| 5,432,871 A | 7/1995 | Novik |
| 5,444,476 A | 8/1995 | Conway |
| 5,446,833 A | 8/1995 | Miller et al. |
| 5,452,450 A | 9/1995 | Delory |
| 5,473,474 A | 12/1995 | Powell |
| 5,479,203 A | 12/1995 | Kawai et al. |
| 5,490,239 A | 2/1996 | Myers |
| 5,495,576 A | 2/1996 | Ritchey |
| 5,508,734 A | 4/1996 | Baker et al. |
| 5,530,650 A | 6/1996 | Bifero et al. |
| 5,539,483 A | 7/1996 | Nalwa |
| 5,550,646 A | 8/1996 | Hassen et al. |
| 5,563,650 A | 10/1996 | Poelstra |
| 5,601,353 A | 2/1997 | Naimark et al. |
| 5,606,365 A | 2/1997 | Maurinus et al. |
| 5,610,391 A | 3/1997 | Ringlien |
| 5,612,533 A | 3/1997 | Judd et al. |
| 5,627,675 A | 5/1997 | Davis et al. |
| 5,631,778 A | 5/1997 | Powell |
| 5,633,924 A | 5/1997 | Kaish et al. |
| 5,649,032 A | 7/1997 | Burt et al. |
| 5,682,511 A | 10/1997 | Sposato et al. |
| 5,686,957 A | 11/1997 | Baker et al. |
| 5,714,997 A | 2/1998 | Anderson et al. |
| 5,729,471 A | 3/1998 | Jain et al. |
| 5,748,194 A | 5/1998 | Chen |
| 5,760,826 A | 6/1998 | Nayer |
| 5,761,416 A | 6/1998 | Mandet et al. |
| 5,764,276 A | 6/1998 | Martin et al. |
| 5,796,426 A | 8/1998 | Gullichsen et al. |
| 5,841,589 A | 11/1998 | Davis et al. |
| 5,844,520 A | 12/1998 | Guppy et al. |
| 5,850,352 A | 12/1998 | Moezzi et al. |
| 5,854,713 A | 12/1998 | Kuroda et al. |
| 5,877,801 A | 3/1999 | Martin et al. |
| RE36,207 E | 5/1999 | Zimmerman et al. |
| 5,903,319 A | 5/1999 | Busko et al. |
| 5,920,337 A | 7/1999 | Glassman et al. |
| 5,990,941 A | 11/1999 | Jackson et al. |
| 5,995,095 A * | 11/1999 | Ratakonda ............ 345/328 |
| 6,002,430 A | 12/1999 | McCall et al. |
| 6,031,541 A * | 2/2000 | Lipscomb et al. ......... 345/425 |
| 6,034,716 A * | 3/2000 | Whiting et al. ............ 348/36 |
| 6,043,837 A | 3/2000 | Driscoll, Jr. et al. |
| 6,121,970 A * | 9/2000 | Guedalia ............... 345/357 |
| 6,157,747 A * | 12/2000 | Szeliski et al. ........... 382/284 |
| 6,192,393 B1 * | 2/2001 | Tarantino et al. ......... 709/203 |
| 6,246,413 B1 * | 6/2001 | Teo ..................... 345/419 |
| 6,271,855 B1 * | 8/2001 | Shum et al. ............. 345/427 |

OTHER PUBLICATIONS

Heckbert, P., "Survey of Texture Mapping" IEEE CG&A, Nov. 1986, pp. 56–67.

Defendants IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 8, 1997, in U.S.D.C., Eastern District of Tennessee.

Defendant IPI's Composit Exhibit List, Civil Action of interactive Pictures Corporation, F/K/A Omniview, Inc. v. Infinite Pictures, Inc. and Bill Tillman, Case No. 3–96–849. Filed: Jan. 5, 1998, in U.S.D.C., Eastern District of Tennessee. pp. 20.

Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tennessee.

Plaintiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 2, 1998, in U.S.D.C., Eastern District of Tennessee.

Ripley G. David, "DVI–A Digital Multimedia Technology". Communication of the ACM. Jul. 1989. vol. 32. No. 07. pp. 811–820.

Cnoe M. and Kuno Y., "Digital Processing CF Images Taken By Fish–Eye Lens". 1982. IEEE. pp. 105–108.

Hamit, F., "Near—Fisheye CCD Camera Broadens View for Imaging". Advanced Imaging. Mar. 1993. pp. 50–52.

Dixon, D., Golin, S., and Hasfield, I., "DVI Video/Graphics". Computer Graphics World reprinted from the Jul. 1987 edition of Computer Graphics World. pp.: 4.

Upstill, Steve. "Building Stronger Images". UNIX Review. Oct. 1988. vol. 06. No. 10. pp.: 63–73.

Greene, N., "Environment Mapping and Other Applications of the World Projections." Computer Graphics and Applications. Nov. 1986. IEEE Computer Society. vol. 06. No. 11. pp.: 21–29.

Hechbert P., "The PMAT and Poly User's Manual". Computer Graphics Lab. N.Y.I.T., Feb. 18, 1983. pp.: 1–29.

Heckbert, P., Fundamentals of Textured Mapping and Image Warping. Master Thesis. pp.: 86. Dated: Jun. 17, 1989.

Rebiai,M., Mansouri,S., Pinson,F., and Tichit, B., "Image Distortion From Zoom Lenses: Modeling and Digital Correction". International Broadcasting Convention. IEEE. Dated: Jul. 1992.

Charles Jeffery, R., "All–Sky Reflector with "Invisible" Camera Support". Images from 1988 RTMC Proceedings. pp.: 79–80.

Roger W. Sinnott, "Scientific Library Gleaning for ATMs". Sky & Telescope. Aug. 1986. pp.: 186.

Charles et al., "How to Build and Use an All–Sky Camera." Astronomy. Apr. 1987. pp.: 64–70.

Deutsch, Cludia H., "One Camera That Offers Many Views". The New York Times.

Johnson, Colin R., "Imaging System Sees All". Electronic Engineering Times. Dec. 25, 1996. pp.: 1&98.

"Panospheric Camera Expands Horizon". pp.: 1.

"Panoshperic Camera Developed at Carnegie Mellon Expands Horizon". pp.: 1.

Castleman, K., "Digital Image Processing". Prentice Hall. 1979. pp.: 110–135, 383–400,408.

Castleman, K., "Digital Image Processing". Prentice Hall. 1996. pp.: 125–127, 140–141.

Shah, S., A Simple Calibration Procedure For Fish–Eye (High Distortion) Lens. IEEE. 1994. pp.: 3422–3427.

"Gnomonic Projection". Map Projections–A Working Manual. pp.: 164–168.

Greene, N., and Heckbert, P., "Creating Raster Omnimax Images From Multiple Perspective Views Using The Elliptical Weighted Average Filter". IEEE. 1986. pp.: 21–27.

Fant, K., "A Nonaliasing, Real–Time Spatial Formation Technique". IEEE. 1986. pp.: 71–80.

Greene, William B., "Qualitative Image Processing Techniques". Digital Image Processing, A Systems Approach. $2^{nd}$ Edition. 1989. Van Nostrand Reinhold. pp.: 92–112.

Wolberg, George. Digital Image Warping (Introduction). 1990. IEEE Computer Society Press. pp.: 2.

Fu, K.S. et al., "Low–Level Vision". Robotics: Control, Sensing, Vision, and Intelligence. 1987.McGraw Hill Inc., pp.: 313–315.

Carlbom, Ingrid et al. "Planner Geometric Projections and Viewing Transformations". Computing Surveys. vol. 10. No. 04. Dec. 1978. pp.: 465–502.

Anderson, R.L., et al., "Omnidirectional Real time Imaging Using Digital Restoration". High Speed Photography SPIE. vol. 348. San Diego, CA. 1982. pp.: 807–814.

Laikin, Milton. "Wide Angle Lens System". 1980. International Design Conference (OSA). SPIE. vol. 237. 1980. pp.: 530–532, 815–816.

Shah, Shisir et al., "Depth Estimation using Fish–Eye Lenses". IEEE. Department Of Electrical and Computer Engineering. University of Texas. 1994. pp.: 740–744.

Tsai, Roger Y., "A Versatile Camera Calibration Technique for High Accuracy 3–D Machine Vision Using Off–the–Shelf TV Cameras and Lenses". IEEE. Journal of Robotics and Automation. vol. RA–3. No. 04. Aug. 1987. pp.: 323–344.

Chang, Yuh–Lin et al., "Calibrating a Mobile Camera's Parameters". Pattern Recognition. vol. 26. No. 01. Dated: 1983. pp.: 75–88.

Weng, Juyang. "Camera Calibration With Distortion Models and Accuracy". IEEE. Transactions On Pattern Analysis and Machine Intelligence. vol. 14. No. 10. Oct. 1992. pp.: 965–980.

Lenz, Reimer K. et al., "Techniques for Calibration of the Scale Factor and Image Center for High Accuracy 3–D Machine Vision Metrology". IEEE. Transaction on Pattern Analysis and Machine Intelligence. vol. 05. No. 05. Sep. 1988. pp.: 713–720.

Nomura, Yoshihiko, et al., "A Simple Calibration Algorithm for High–Distortion Lens Camera". IEEE. Transaction on Pattern Analysis and Intelligence Machine. vol. 14. No. 11. Nov. 1992. pp.: 1095–1099.

International Broadcasting Convention Venue RAI Congress And Exhibition Centre, Amersterdam, The Netherlands. Jul. 3–7, 1992. pp.: 06, Including the title page.

Telerobotics International, Inc. "Optimizing The Camera And Positioning System For Telerobotic Workcite Viewing".

Miyamoto, K., "Fish Eye Lens". JOSA. vol. 54. pp.: 1060–1061. Dated: Aug. 1964.

Plaintiff's Rule 26(a)(3) Disclosures, Civil Action of Interactive Pictures Corporation, F/K/A Omniview, Inc. V. Infinite Pictures, Inc. and Bill Tillman, Case No. 3–96–849. Filed: Dec. 8, 1997 in U.S.D.C. Eastern District of Tennessee. pp.: 31.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 5, 1998 in U.S.D.C., Eastern District Of Tennessee. pp.: 20.

Baltes, M. "Bevet D'Intervention". Ref. No.: N 1.234.341.

Verity, John W. (edited by): Information Processing. Business Week. p.: 134E. Dated: Jul. 13, 1992.

Marbach, William D. (edited by): Developments To Watch. Business Week. p.: 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp.: 36–37. Dated: Sep. 1992.

Tulloch, Martha. "New Video Camera . . ." Photonics Spectra. pp.: 18–20. Dated: Oct. 1992.

Fisher, Timothy E., A Programmable Video Image Remapper. SPIE> vol. 938. pp.: 122–128. Dated: 1988.

Lippman, Andrew. Movie–Map: An Application Of The Optical Videodisc To Computer Graphics. pp.: 43. Dated: 1980.

Yelick, Steven. Anamorphic Image Processing. pp.: 1–37, Including Acknowledgement Page. Dated: 1980.

Chen, Shenchang Eric. Quick Time VR–An Image–Based Approach To Virtual Environment Navigation. pp.: 39. Dated: 1995.

\* cited by examiner

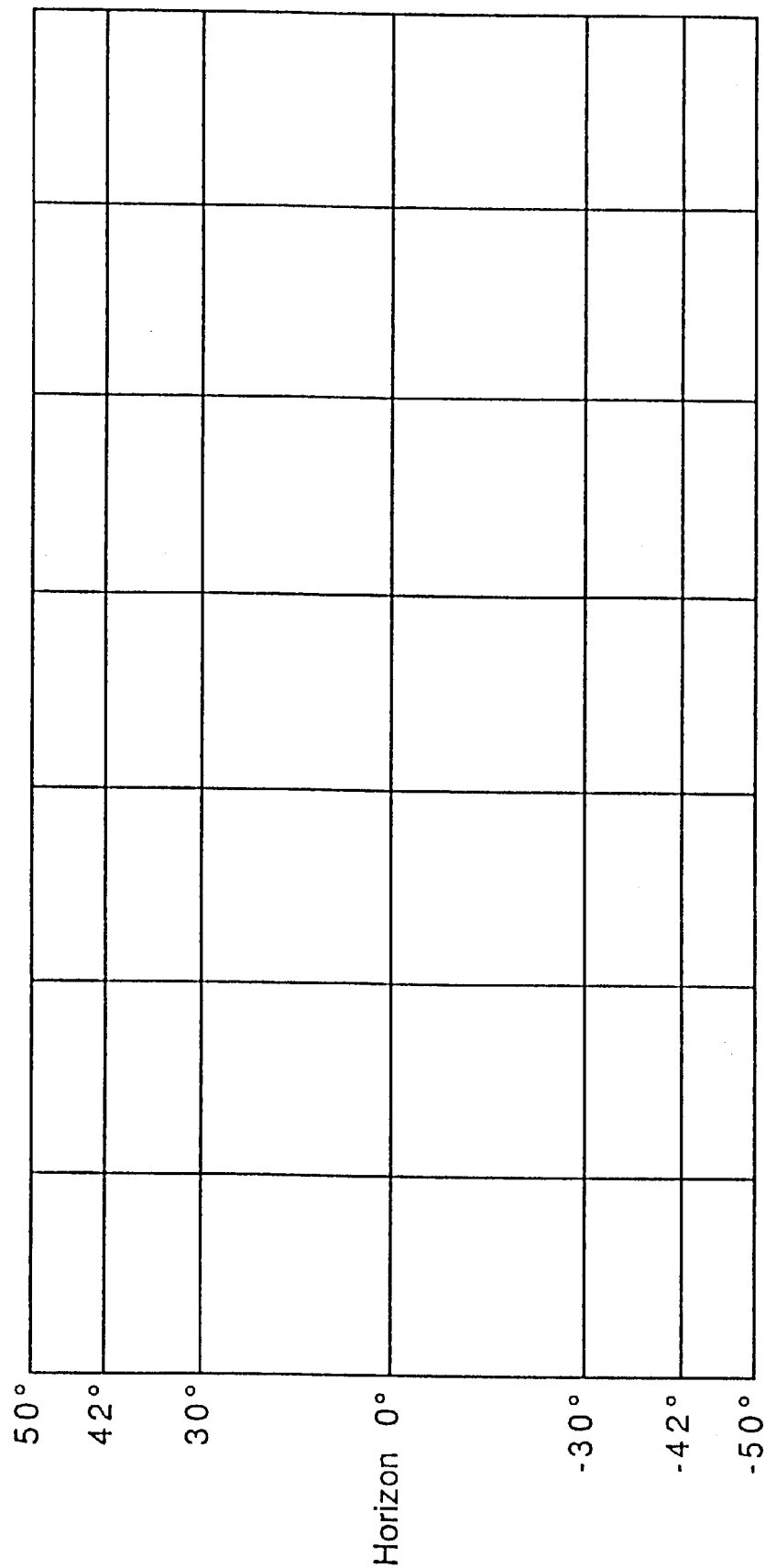

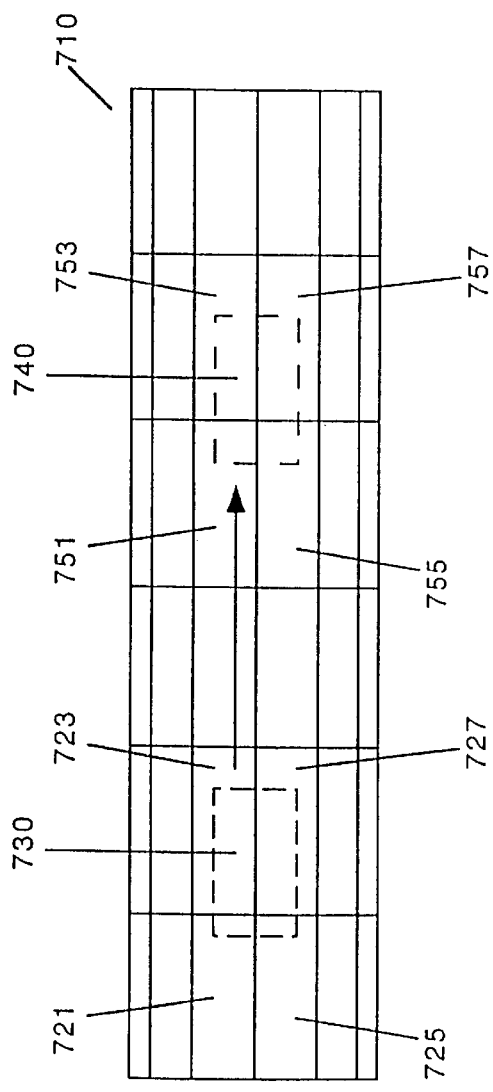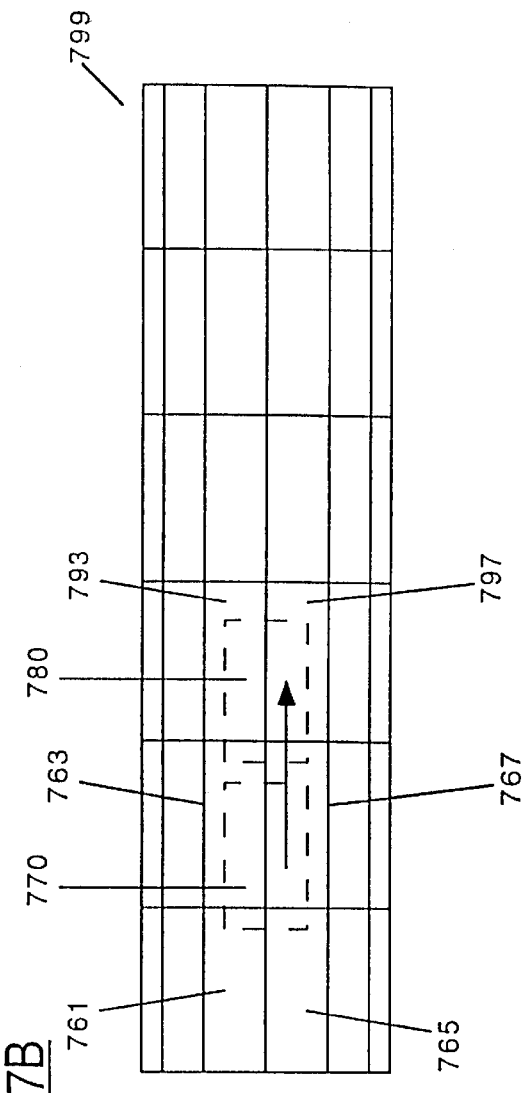

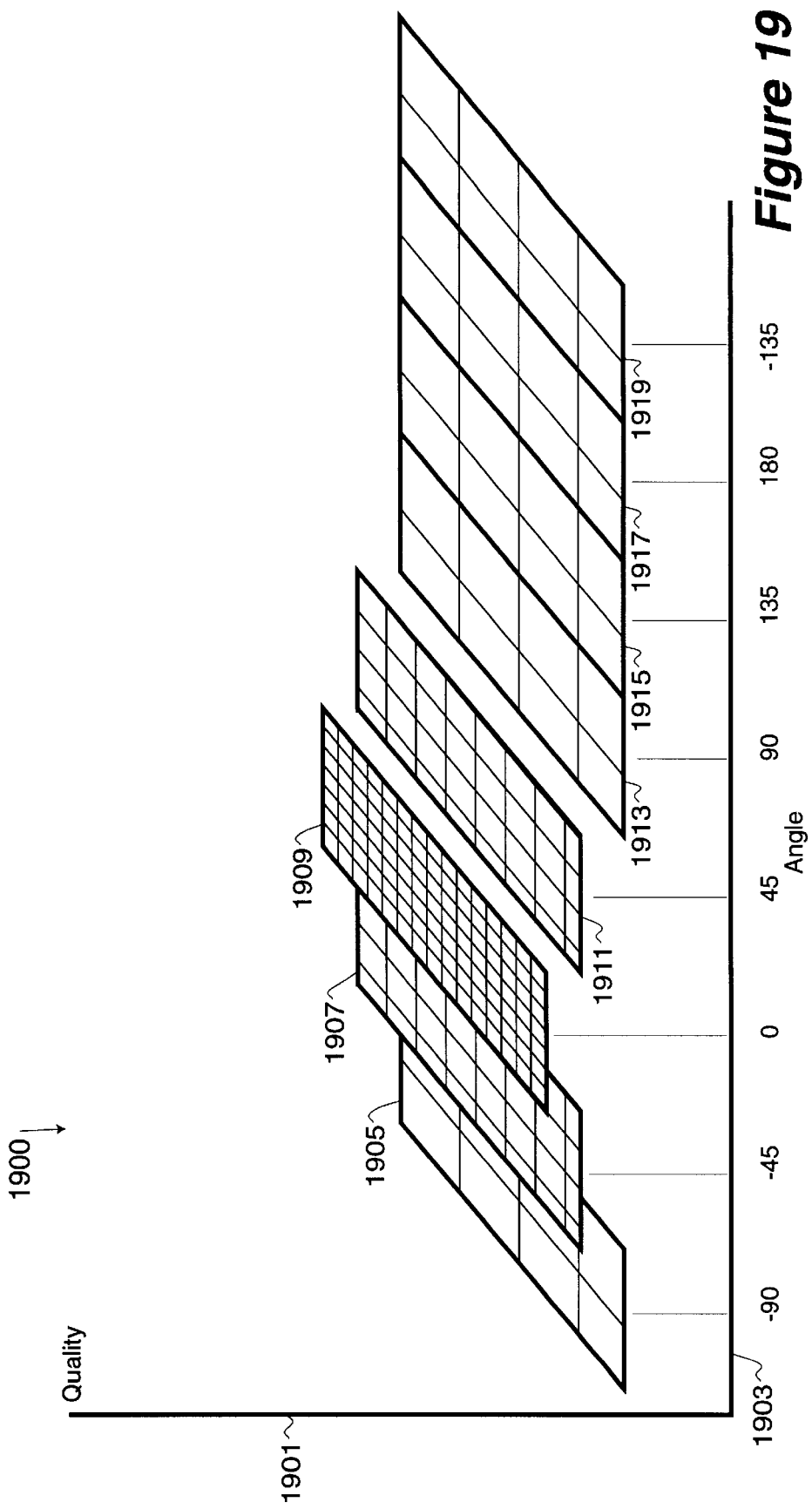

METHOD AND APPARATUS FOR ELECTRONICALLY DISTRIBUTING MOTION PANORAMIC IMAGES

This is a continuation-in-part of U.S. application Ser. No. 09/131,186, filed Aug. 7, 1998, which is incorporated herein by reference in its entirety; this is also a continuation-in-part of U.S. application Ser. No. 09/344,528 filed Jun. 24, 1999 that is a continuation of U.S. application Ser. No. 08/852,920 filed May 5, 1997 now U.S. Pat. No. 6,043,837 which is incorporated herein by reference in its entirety.

FIELD OF THE INVENTION

The present invention relates to the field of image processing and data distribution. In particular the present invention discloses methods and apparatus for processing, transmitting, and post-processing panoramic image information.

BACKGROUND OF THE INVENTION

Most cameras only record a view within a small viewing angle. Thus, a typical conventional camera only captures an image in the direction that the camera is aimed. Such conventional cameras force viewers to look only at what the camera operator chooses to focus on.

Panoramic cameras capture a much wider field of field. A panoramic camera constructed using an optical "fish-eye" lens may capture at most a 210-degree field of view. A panoramic camera constructed with a catadioptric lens captures a full 360-degree panoramic image. With a large panoramic field of view, individual panoramic image viewers can decide what they will focus on.

Conventional images are often delivered by electronic means. For example, television and the Internet deliver conventional images across wired and wireless electronic media. However, there are no standard means of delivering panoramic images electronically. Since panoramic images are so large, it is difficult to deliver panoramic images using conventional image transmission techniques. To further compound the problem, motion panoramic images traditionally require a very high bandwidth channel for electronic distribution. Thus, it would be desirable to have an electronic distribution system that efficiently distributes motion panoramic image information.

Another difficulty with motion panoramic images is that a user often desires to rapidly pan the view from one area of the panorama to another. Because of the limited bandwidth available for sending the panoramic image from a motion panoramic image server to a client system, such rapid pan operations result in significant latency delays and/or temporal tearing between the time the user performs the pan operation and the display of the resulting view. Thus, it would be desirable to utilize the available bandwidth to provide both high-quality data (for the portion of the motion panoramic image being viewed) and lower-quality data (for the portions of the motion panoramic image that are not being viewed and dependent on the likelihood of that portion being viewed).

Yet another problem with the prior art distribution of motion panoramic images is caused by the latency between a user's command and the result of the user's command. This latency is a function of the time required to send the command to the image encoder and the time required by the encoder to propagate the response to the command back to the user. This latency can be of the order of tens of seconds. Thus, it would be advantageous to provide technology that allows the user's command to be satisfied by a server between the encoder and the client.

Although the communication link between server computers and client computers are beginning to have more bandwidth with the use of digital subscriber lines (DSL) and ISDN, the amount of information flowing across these larger bandwidth links are more complex, are of higher resolution, and higher frame rates. Thus, bandwidth limitations occur even for these more advanced communication links. Thus, it would be advantageous to provide techniques for using the available bandwidth to present a high-quality image while at the same time maintaining sufficient information about the non-presented portions of the panorama to minimize the consequences of panning outside of the high-quality image.

SUMMARY OF THE INVENTION

One embodiment discloses an electronic image distribution apparatus for distributing motion panoramic images. The main portion of the apparatus is a motion panoramic image server that has a source of motion panoramic images. The source of panoramic image frames can be a motion panoramic image playback device or a connection to a motion panoramic camera system. The motion panoramic image server transforms the panoramic image frames into an intermediate planar representation that is more conducive for electronic transmission. The motion panoramic image server then transmits the motion panoramic images to client systems.

In addition, one preferred embodiment discloses methods and apparatus for obtaining portions of a panorama over a limited bandwidth link. The invention uses an encoder array to multiply encode the panorama into tiles that have different characteristics. The computer that uses the encoded data to present a view into the panorama subscribes to the tiles containing the encoded data. The tiles that are subscribed-to are selected based on the bandwidth available to transfer the tiles and the quality of the data in the tiles. The computer selects higher-quality tiles near the viewpoint and lower-quality tiles dependent on the distance the tile is from the viewpoint. As the viewpoint is altered (such as by a pan operation) the computer dynamically adjusts the tile subscription to present a quality image. If the pan operation moves the viewpoint such that data from lower-quality tiles is required to present the view, the data is presented using the lower-quality data until the higher-quality data resulting from the new tile subscription arrives. The presentation of the lower-quality data can be reduced or avoided by limiting the range of an allowable pan, by predicting a future need for high-quality tiles based on a pan history, by providing tiered tiles near the viewpoint to reduce temporal and other presentation artifacts.

Another preferred embodiment provides an entire panorama containing distributed-quality data to the client computer. In this embodiment, the panorama is encoded such that a portion of the panorama is encoded for high-quality, other portions of the panorama are encoded for reduced-quality, and yet other portions of the panorama are encoded for low-quality (one skilled in the art will understand that more than three levels of quality can be used within the panorama). Multiple encodings of the panorama differing by the placement of the relative quality portions are provided to the client. The client is thus able to select the panorama encoding that includes a high-quality portion responsive to the client's viewpoint. When the viewpoint moves away from the high-quality portion of the currently selected panorama encoding, the client subscribes to a different panorama encoding that includes a high-quality portion at responsive to the new viewpoint.

Preferred embodiments include (without limitation) system methods, client computer side methods, server computer side methods, server apparatus, client apparatus, and computer program products for the server computer and the client computer.

Other objects, features and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which:

FIG. 5C illustrates a panoramic image frame in a cylindrical intermediate planar representation that has been divided into individual tiles or a spherical intermediate planar representation that has been adjusted and divided into tiles.

FIG. 7A illustrates a view within a panoramic image frame intermediate planar representation that has suddenly shifted by a large angular value.

FIG. 7B illustrates a view within a panoramic image frame intermediate planar representation that has suddenly shifted by a small angular value.

FIG. 19 illustrates a conceptual example of tiered data used to present a panoramic image in accordance with a preferred embodiment.

DETAILED DESCRIPTION OF THE PREFERRED EMBODIMENT

A method and apparatus for compressing and distributing motion panoramic images is disclosed. In the following description, for purposes of explanation, specific nomenclature is set forth to provide a thorough understanding of the present invention. However, it will be apparent to one skilled in the art that these specific details are not required in order to practice the present invention. For example, the present invention's method of distributing panoramic images has been described with reference to the Internet. However, other types of digital information distribution systems (for example private data networks and satellite systems) may be used with the teachings of the present invention.

The Basic Panoramic Camera Design

Figure 1:
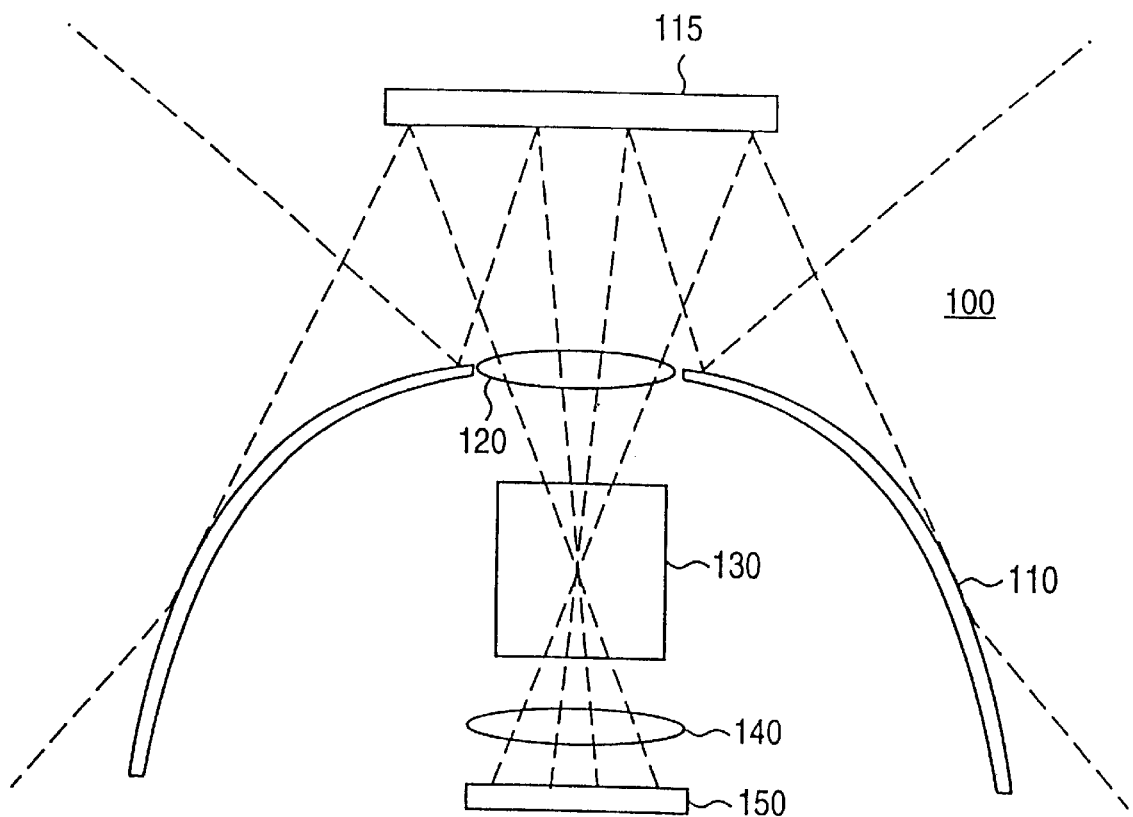
FIG. 1 illustrates one embodiment of a panoramic camera system that creates annular images.

FIG. 1 illustrates an embodiment of one possible 360-degree panoramic camera system. The image capture mechanism 150 of the panoramic camera system captures an angular image of the surrounding panorama that is reflected off the main reflector 110. More details about the panoramic camera system of FIG. 1 can be found in the copending patent application entitled "Panoramic Camera", filed Jun. 11, 1997, having Ser. No. 08/872,525 and which is hereby incorporated by reference.

Figure 2A:
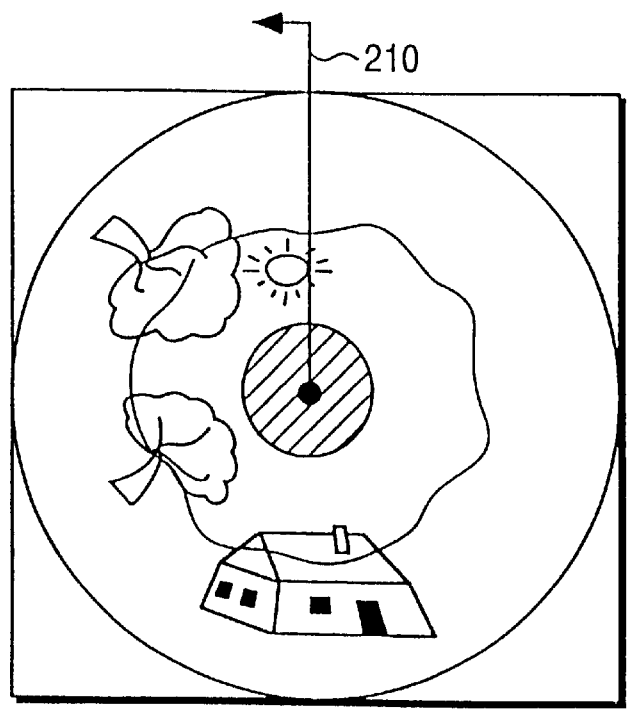
FIG. 2a illustrates an annular image that is recorded by the panoramic camera system of FIG. 1.
Figure 2B:
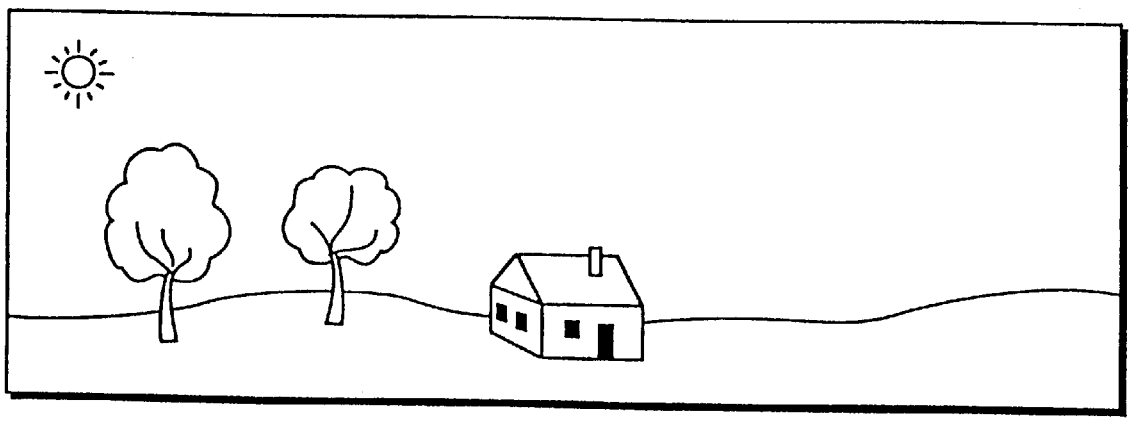
FIG. 2b illustrates how the annular image of FIG. 2a appears after it has been unwrapped by geometrical transformation software.

FIG. 2a illustrates an example of a panoramic image captured as an annular image. As illustrated in FIG. 2a, the surrounding panorama is distorted by the main reflector having radial symmetry such that the surrounding represented as a two-dimensional annular image. In one embodiment, the shape of the main reflector transforms the standard rectangular coordinate system of the image into a polar coordinate system. To view the panoramic image captured as a two-dimensional annular image, the annular image may be unwrapped to create an intermediate planar representation. The unwrapping is performed using a geometric transformation operation. FIG. 2b illustrates how the annular image of FIG. 2a appears after the images are geometrically transformed from the annular representation to a rectangular intermediate planar representation.

Figure 3:
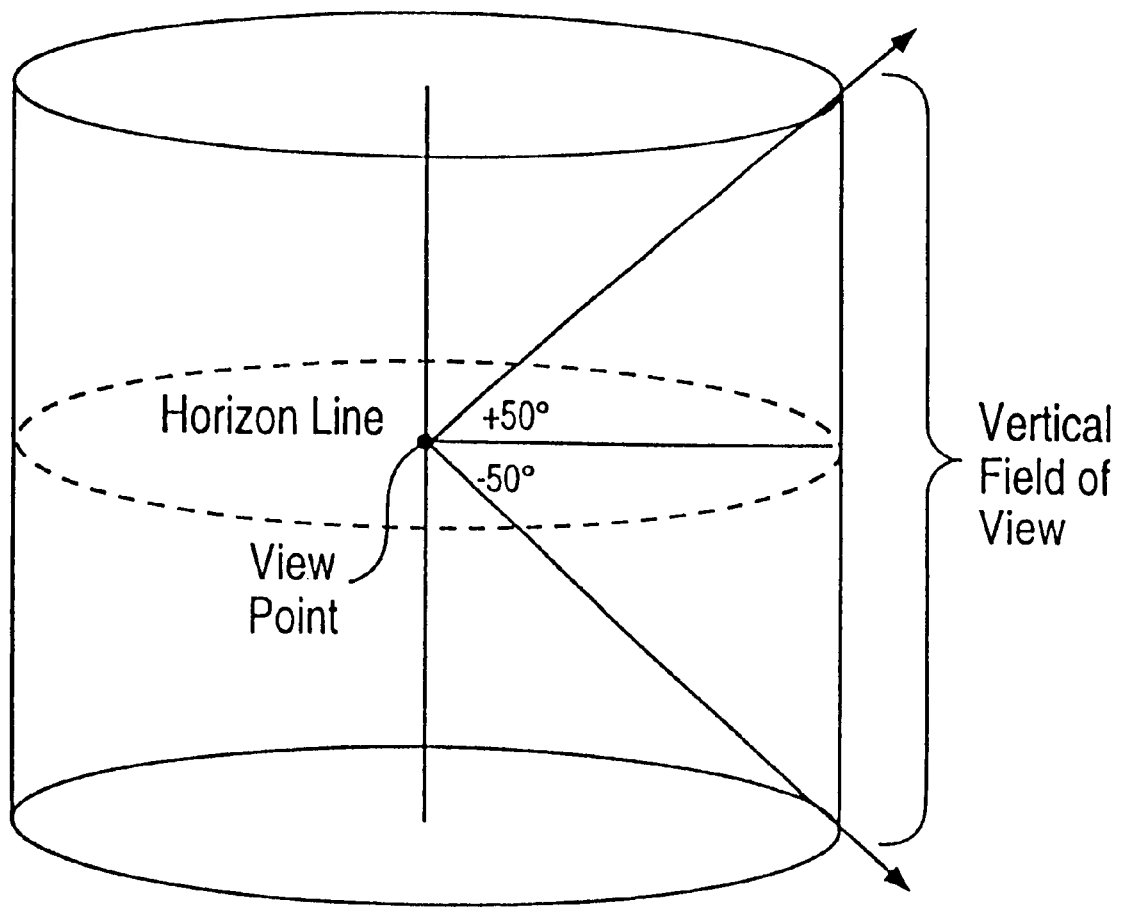
FIG. 3 illustrates the 360-degree band that the panoramic camera system of FIG. 1 captures and FIG. 3 also illustrates a cylindrical projection data format.

The panoramic camera system of FIG. 1 captures an entire 360-degree image of the surrounding horizon as illustrated in FIG. 3. The panoramic camera system captures a panoramic image that includes objects as low as 50 degrees below the horizon and objects as high as 50 degrees above the horizon. However, alternate panoramic camera systems may capture a full spherical panoramic view, a partial 180-degree hemispherical view, or any other panoramic view. Furthermore, a panoramic image may be constructed by combining a mosaic of conventional images captured with conventional camera systems. For example, eight conventional cameras can be used to capture images from eight different directions. Those images are then combined together to create a single panoramic image.

A Motion Panoramic Image Capture System

Figure 4:
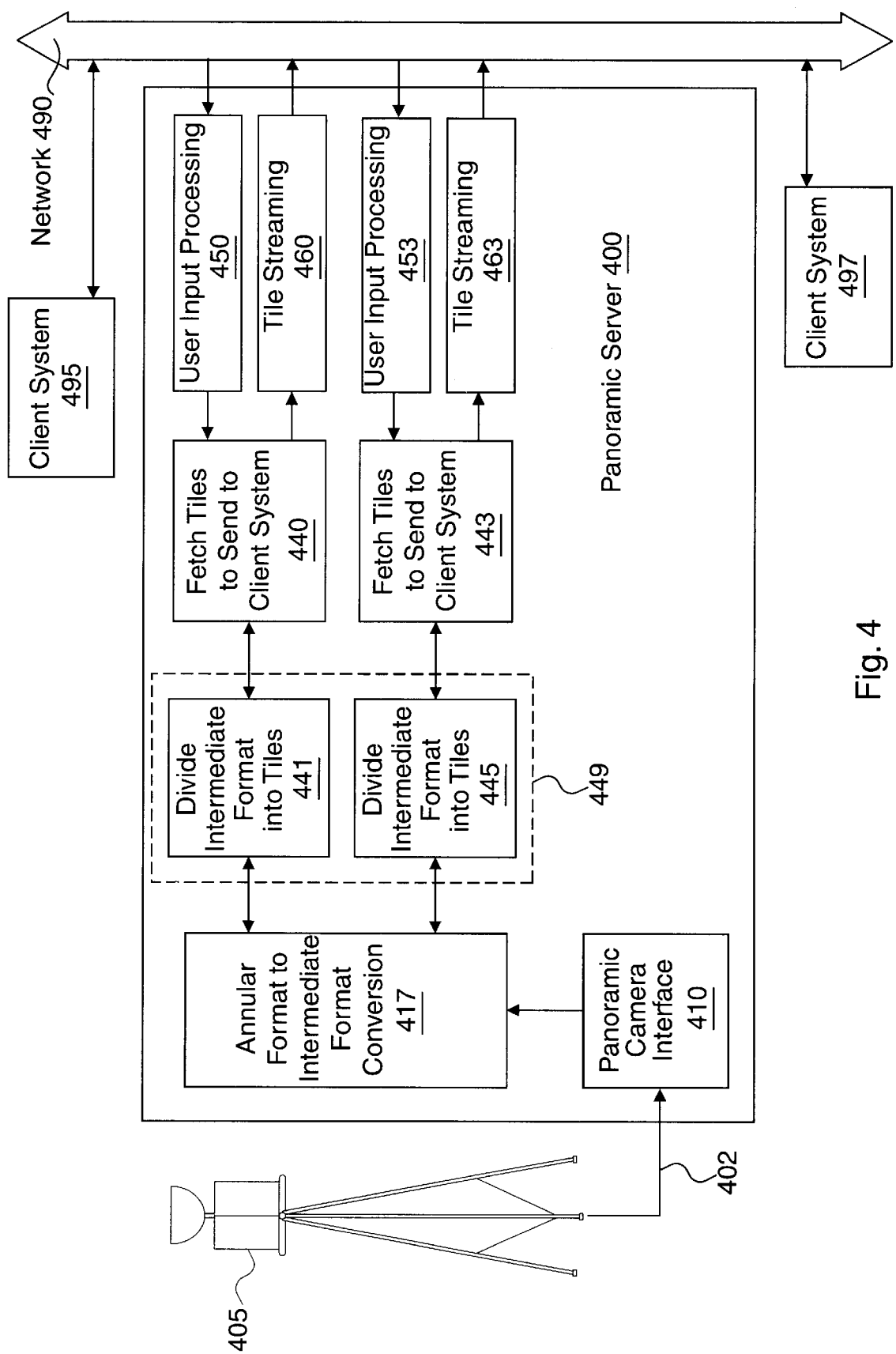
FIG. 4 illustrates a networked computer systems arrangement used to distribute motion panoramic images captured by the panoramic camera system FIG. 1 from a panoramic image server to client systems.

When the image capture mechanism 150 of the panoramic camera of FIG. 1 is a motion image capture mechanism such as a charged coupled device (CCD) or a film-based motion picture image capture system, then it is possible to capture a series of panoramic annular images. The series of panoramic annular images can be used to generate a motion panoramic display. FIG. 4 illustrates one possible embodiment of an electronic motion panoramic image capture system.

Referring to FIG. 4, a panoramic camera system 405 captures a series of panoramic annular image frames with an electronic image capture mechanism. For example, the electronic image capture mechanism can be a charged coupled device image capture mechanism or CMOS image sensor that generates digitized panoramic annular image frames. The panoramic annular image frames are transmitted from panoramic camera system 405 to a panoramic image server 400 across a high bandwidth communication link 402. The communication link must be high bandwidth since each panoramic annular image frame contains a very large amount of information and, to provide a flicker-free motion image, several panoramic images must be transmitted each second.

Alternate embodiments of motion panoramic image capture systems can also be used. For example, a motion panoramic capture system may be created with two motion picture camera systems pointing in opposite directions wherein each motion picture camera system is equipped with a fisheye lens that captures at least a 180 degree hemispherical field of view. In such a panoramic image system, two distorted fisheye images from each hemispherical view would need to be "stitched" together to create a single panoramic image.

A First Motion Panoramic Image Distribution System Embodiment

As previously set forth, the full panoramic annular image frames generated by the panoramic camera system (such as panoramic camera system 405 of FIG. 4) are so large that a very high bandwidth link is needed to transmit full motion images to a recipient. Such high bandwidth links are rare and expensive. Thus, for mass distribution of panoramic imagery, more bandwidth efficient methods of distributing panoramic images are needed.

The present invention introduces two different methods of distributing motion panoramic images. A first method divides panoramic images into tiles and transmits only the tiles needed to construct a desired image. A second method, described in a later section, divides panoramic images into individual tiles and then transmits all the tiles on different multicast channels.

The Selective Tile Transmission System

To efficiently transmit a panoramic image, the present invention first proposes a selective tile transmission system. In the selective tile transmission system, a server computer system divides each panoramic frame into tiles. The tile size and shape are preferably selected in such a manner that is dependent upon a coordinate system used by the format used to transmit the tiles. Then, the tiles needed to construct an image on a client computer system are transmitted from the server system to individual clients.

In a preferred embodiment, the server system transforms each incoming panoramic image frame into an intermediate planar representation. This transformation step is not necessary but provides certain advantages. The selective transmission system will be described with reference to a system that performs this transformation in FIGS. 4, 5, 6, 7, 8 and 9.

Referring to the particular embodiment of the selective transmission system illustrated in FIG. 4, a panoramic annular image transformation system 417 "unwraps" annular panoramic image frames into an intermediate planar representation. The intermediate planar representation is more convenient for generating images suitable for viewing. Specifically, the intermediate format should require fewer calculations to generate a final rectangular projection.

Figure 5A:
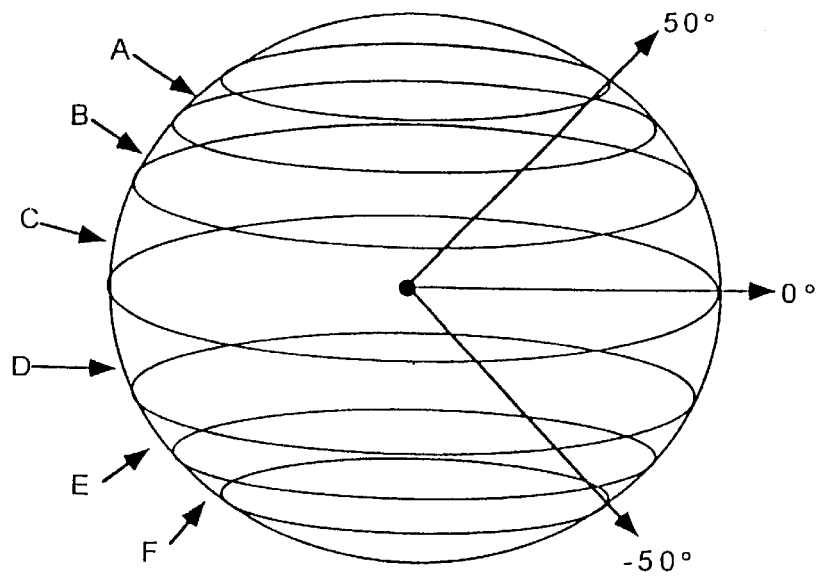
FIG. 5A illustrates a conceptual view of a spherical view captured by the panoramic camera system of FIG. 1.

In one embodiment, the incoming annular panoramic image data is geometrically transformed into a spherical coordinate system with a spherical projection representation. In such an embodiment, a single frame of the image data may be viewed with the Live Picture viewer from Live Picture, Inc. FIG. 5A conceptually illustrates a spherical data format wherein the view of the surroundings is projected onto a sphere surrounding a viewpoint.

In another embodiment, the incoming annular panoramic image data is geometrically transformed into a cylindrical coordinate system in a cylindrical projection representation. An image transformed into a cylindrical coordinate system may be viewed with the QuickTime VR viewer created by Apple Computer, Inc. FIG. 3 conceptually illustrates a cylindrical data format wherein the view of the surroundings is projected onto a cylinder surrounding a viewpoint.

After converting the panoramic image frames into an intermediate planar representation, the system of the present invention divides the intermediate planar representation into individual tiles. In the present invention, the size of the tiles are dependent upon the coordinate system of the intermediate planar representation. In such embodiments, the tiles may be spatially variant.

The size of the tiles may further be dependent upon the client system that will be displaying the panoramic image data. In such an embodiment, each client uses a different process (441 or 445) to divide intermediate planar representations into tiles since each client may use different client sizes. However, in a standardized embodiment, the size of the tiles are fixed such that a single process (illustrated as dotted box 449) may be used to divide an intermediate planar representation into individual tiles.

FIG. 5A illustrates a conceptual diagram of the spherically encoded intermediate 5 planar representation. As illustrated in FIG. 5A, the spherically encoded intermediate planar representation represents the surrounding world as image data mapped onto a sphere. To divide and organize the data, the sphere is broken into individual bands on sphere A, B, C, D, E, and F. Note that the bands near the "equator" of the spherically encoded intermediate planar representation contain more data than the bands closer to the "poles."

Figure 5B:
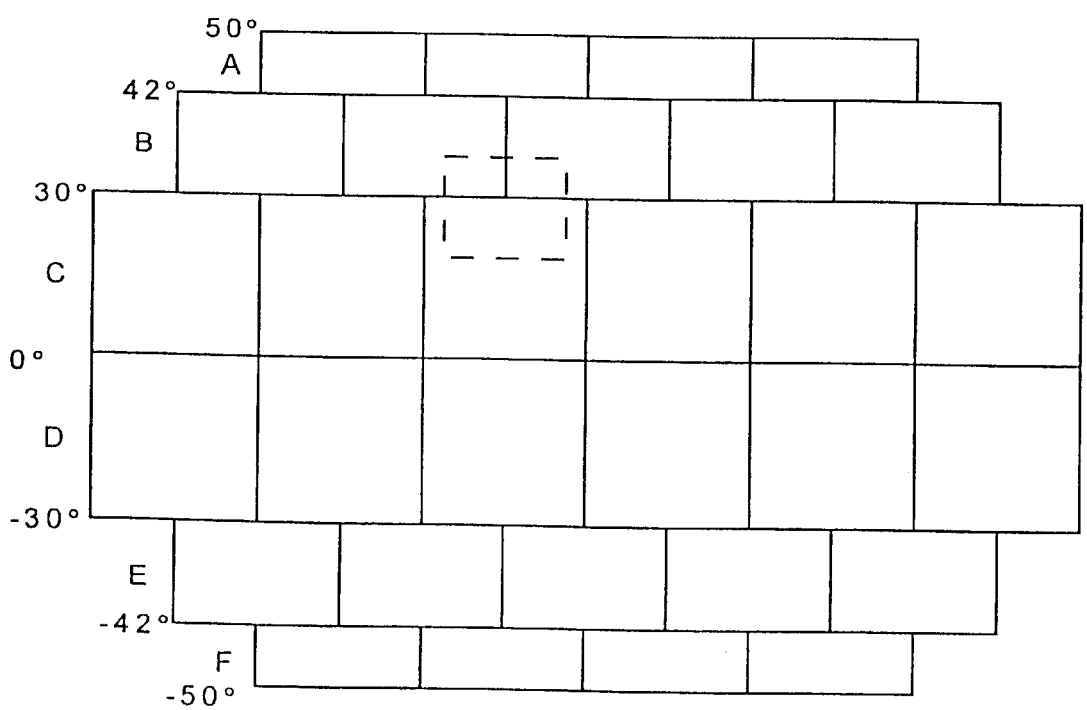
FIG. 5B illustrates a panoramic image frame in a spherical intermediate planar representation that has been unwrapped and divided into individual tiles.

In one embodiment of the present invention, the image data is represented by individual bands that are divided into individual tiles as illustrated in FIG. 5B. Note that there will be fewer tiles in the bands from higher inclination angles. Alternatively, there will be the same number of tiles, but the tiles will contain data from smaller yaw angles. If the data from the smaller yaw angles is increased, this type of intermediate data format can be graphically illustrated as shown in FIG. 5C. Note that the graphical data representation of FIG. 5C also matches the cylindrical data format of FIG. 3. Although the data format of FIG. 5B may be used and provides certain advantages (such as a more compact data format) this document will focus on the format of FIG. 5C to simplify the description.

Referring to the particular embodiment of FIGS. 5A, 5B, and 5C, a first row of tiles covers from the horizon line to thirty degrees above the horizon. A second row of tiles covers from thirty degrees above the horizon to forty-two degrees above the horizon. A third, top, row of tiles covers the band from forty-two degrees above the horizon to fifty degrees above the horizon. The same angular divisions are used to divide the space below the horizon. The row size divisions are nonlinear and widest at the horizon since users are usually most interested in views near the horizon. However, different angular divisions, such as linear angular divisions, may also be used.

After dividing each unwrapped panoramic image into tiles, a tile fetching program (440 and 443) fetches tiles for transmission to the client system. Ideally, the tile-fetching program only selects the tiles needed to create a view on a client computer system. In a preferred embodiment, the client computer system determines which tiles are needed and sends a request that specifies these tiles. The fetched tiles are transmitted using a tile-streaming program (460 and 463). By transmitting only the tiles needed to create a view on the client computer system, the system of the present invention limits the amount of information that must be transmitted from a panoramic image source server to a panoramic image client display.

Tile Tiering for Magnification

To accommodate several different magnification levels, several different sets of tile resolution may be created. For example, a low resolution "zoomed back" initial set of tiles may be used for panning around a panoramic image. The low-resolution initial tiles would encompass a large angular view. When an interesting area of the panoramic image is selected, a higher resolution set of tiles could then be selected.

Figure 5D:
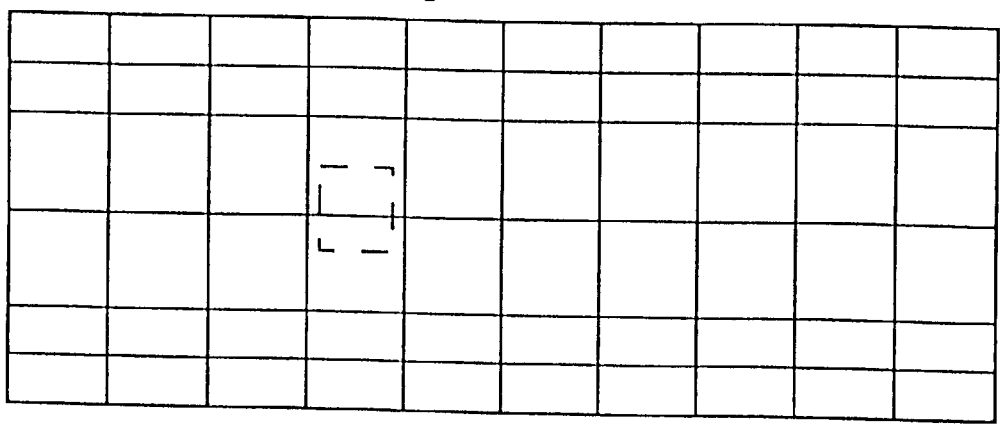
FIG. 5D illustrates a panoramic image frame in a low-resolution intermediate planar representation that has been divided into individual tiles.
Figure 5E:
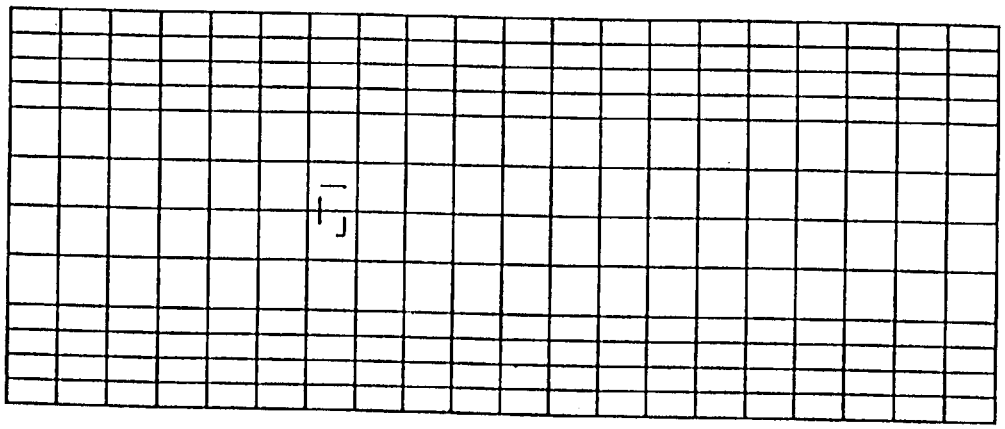
FIG. 5E illustrates a panoramic image frame in a medium resolution intermediate planar representation that has been divided into individual tiles.
Figure 5F:
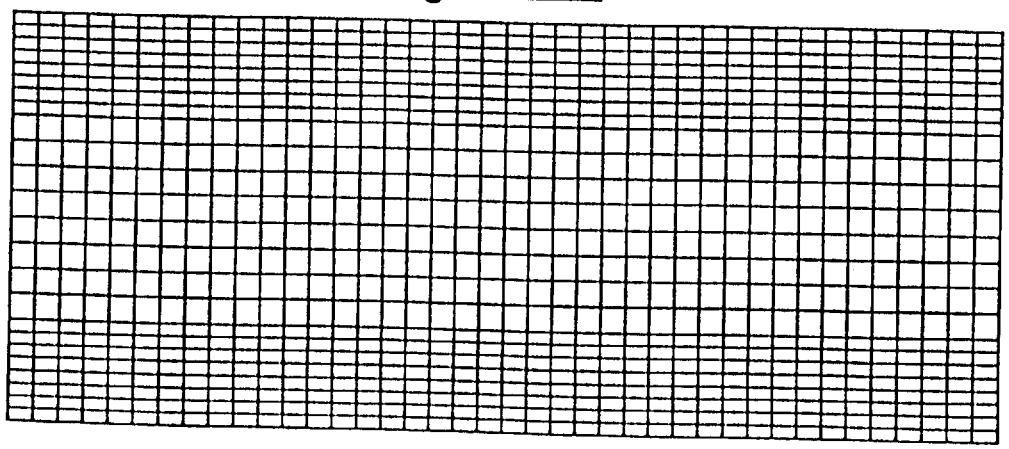
FIG. 5F illustrates a panoramic image frame in a high-resolution intermediate planar representation that has been divided into individual tiles.

FIGS. 5D, 5E and 5F illustrate one possible embodiment where a panoramic image space has been divided into three tiers of magnification. An initial "zoomed back" tile magnification intermediate planar representation is presented in FIG. 5D. The lower resolution intermediate planar representation of FIG. 5D is used first. When a user wishes to see a portion of a view in greater detail, the client software "zooms in" by fetching tiles from the next higher resolution intermediate planar representation displayed in FIG. 5E. If even greater resolution is needed, the client software "zooms in" further by fetching tiles from FIG. 5F. In one embodiment, the pixel resolution of the individual tiles of FIGS. 5D, 5E and 5F is the same such that the individual tiles take up the same amount of screen space but provide successively greater resolution.

Tiling without Transformation

As stated in the beginning of this section, the initial panoramic image frames need not be transformed into an intermediate planar representation before division into individual tiles. The intermediate planar representation transformation is usually performed since the transformation is used to put the image into a format that can be used to quickly generate an image for display with minimal processing. However, the raw panoramic image frames may immediately be divided into tiles and transmitted.

Figure 5G:
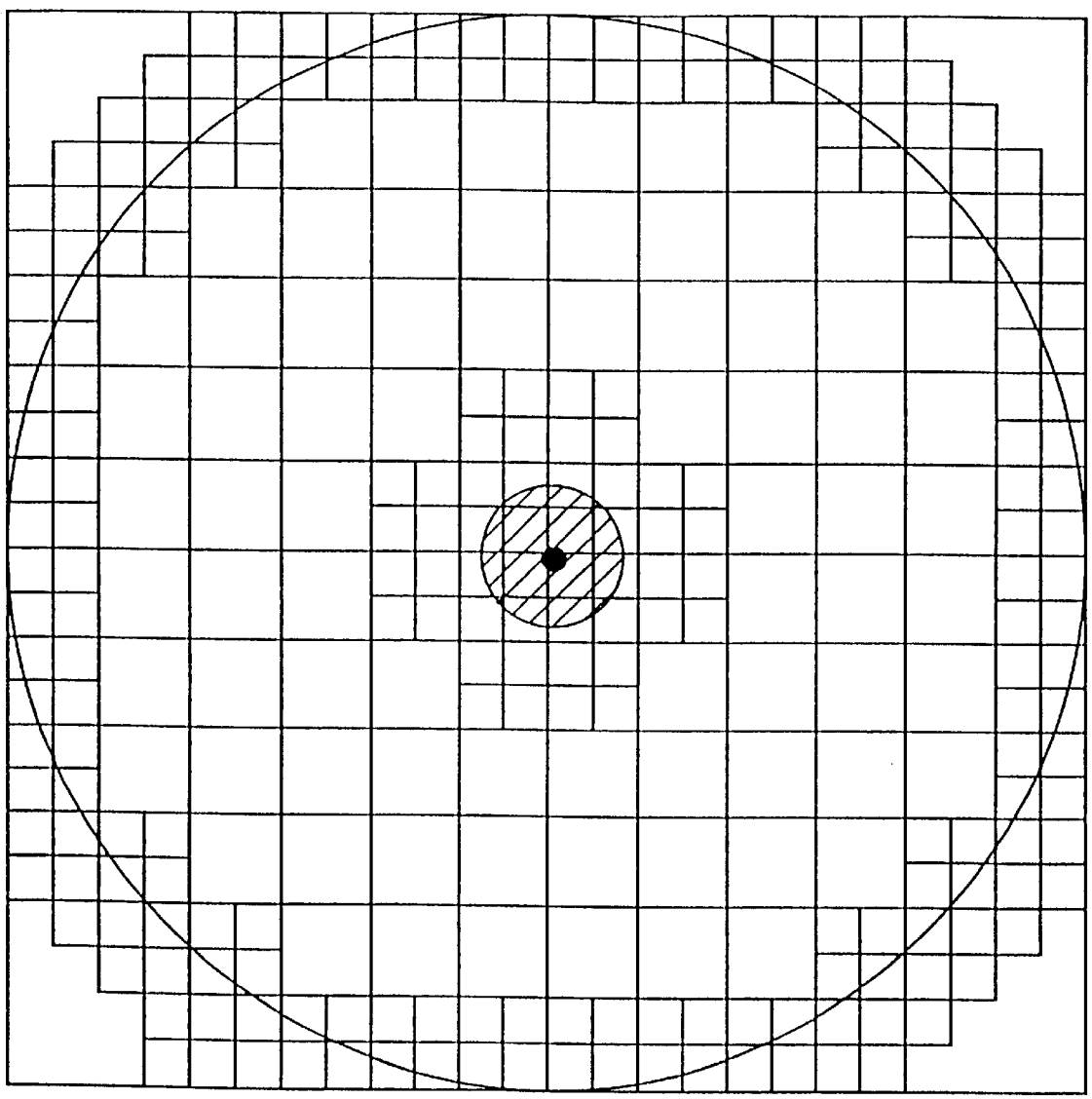
FIG. 5G illustrates a panoramic annular image frame that has been divided into spatially variant tiles.

For example, FIG. 5G illustrates a raw panoramic annular image frame from the panoramic camera system of FIG. 1. Before transmitting, the raw panoramic annular image is divided into tiles. In the embodiment of FIG. 5G, the raw panoramic annular image is divided into square tiles that are small near the center since a small tile covers a wide image area in the annular format.

The middle part of the annular disk is divided into larger tiles. The outside of the annular disk is divided into smaller tiles since a narrow strip of tiles is needed when constructing a view that uses information from the edge of the annular disk. Thus, the tiles are spatially variant.

Tile Positional Selection

Figure 6A:
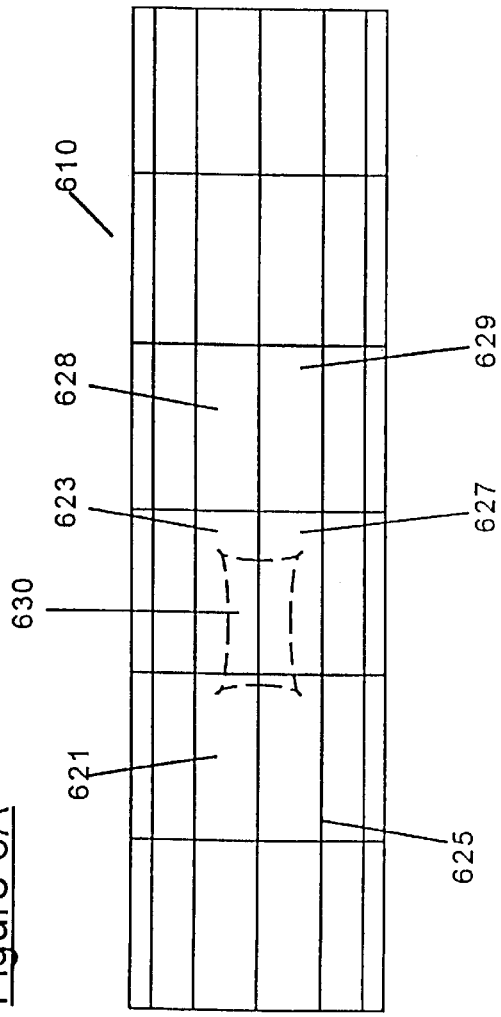
FIG. 6A illustrates a view within a panoramic image frame in an intermediate planar representation.
Figure 6B:
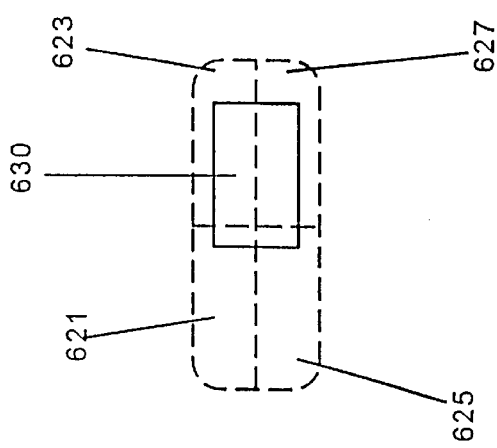
FIG. 6B illustrates four tiles from FIG. 6A transmitted to construct a view within a client system.

FIG. 6A illustrates an example of a client system view into a panoramic image. Specifically, client view 630 represents a view into an unwrapped panoramic image 610 requested by a client computer system. The view is distorted since the view is illustrated within the spherical coordinate space. To construct the view 630 at a client system, a server (such as server 400) transmits tiles 621, 623, 625, and 627. Each tile 621, 623, 625, and 627 is compressed before transmission to further reduce the amount of information that needs to be transmitted. FIG. 6B illustrates how the four tiles 621, 623, 625, and 627 transmitted from the server are used to construct the client view 630 on a client computer system. (The four tiles 621, 623, 625, and 627 appear distorted since the tiles are displayed in the rectangular projection coordinate space of FIG. 6B.)

Referring back to FIG. 6A, if a user moves the view 630 further to the right, then the view will cease to need tiles 621 and 623 and will instead begin to need tiles 628 and 629. To accommodate such situations, the client system begins requesting tiles that are just slightly out of a current view when a view nears the edge of a tile in case the user moves further in that direction. Thus, in the example of FIG. 6A, the client system would begin requesting tiles 628 and 629 when the view shifts a little further to the right. Thus, the tile-fetching program in the server would fetch and transmit tiles 628 and 629 to the client system. Then, if the client view 630 progresses even further to the right, tiles 623, 628, 627, and 629 would be used to construct the shifted client view in the client system.

In a preferred embodiment, the client computer system is responsible for determining when the out of view tiles are needed and when they should be transmitted. The client system makes this determination by examining factors such as how fast the user is moving the view, the latency of the connection with the server, and the parameters that define the view. The client computer system transmits a list of desired tiles to the server wherein the list of desired tiles defines which tiles should be transmitted by the server to the client computer system.

The movement anticipation procedure described in the previous two paragraphs works well for small incremental client view shifts (which most view changes comprise). However, if a user makes a sudden quick view change, the needed tiles will not be available. For example, referring to FIG. 7A, a user may quickly shift a view from a first view position 730 to a second view position 740. The first view position 730 was being rendered with tiles 721, 723, 725, and 727 that were sent by a server. The new second view position 740 requires tiles 751, 753, 755, and 757 that were not being transmitted.

To handle such sudden view changes, the present invention occasionally transmits a highly compressed version of the full panoramic image intermediate planar representation. The highly compressed panoramic image intermediate planar representation is only transmitted once every 30 or so normal frames. When a fast movement occurs, the client renders a view from the most recently received highly compressed panoramic image intermediate planar representation. This newly rendered view will not be in the normal resolution since it is being rendered from the highly compressed panoramic image intermediate planar representation. Simultaneously, the server will begin transmitting the tiles needed at the new view location.

In the example of FIG. 7A, the server will begin transmitting tiles 751, 753, 755, and 757. When tiles 751, 753, 755, and 757 are received by the client computer system, the image rendered from the most recently received highly compressed panoramic image intermediate planar representation will be replaced with an image rendered from tiles 751, 753, 755, and 757. Thus, the new view image will become clearer once the server "catches up" to the users sudden view change.

A sudden movement may not move the view completely away from the currently available tiles. For example, a movement may place the view partially on tiles that are available and partially on tiles that are not available. In such a situation, the portion of the view that is located on available tiles can be rendered at the resolution of those tiles and the remainder of the view will be rendered using the highly compressed version. Similarly, if the user is "zoomed in" on high resolution tiles and the user moves quickly away from the currently available high resolution tiles, the view may be constructed using the tile from the next lower resolution tier if that tile is still available.

Figure 8:
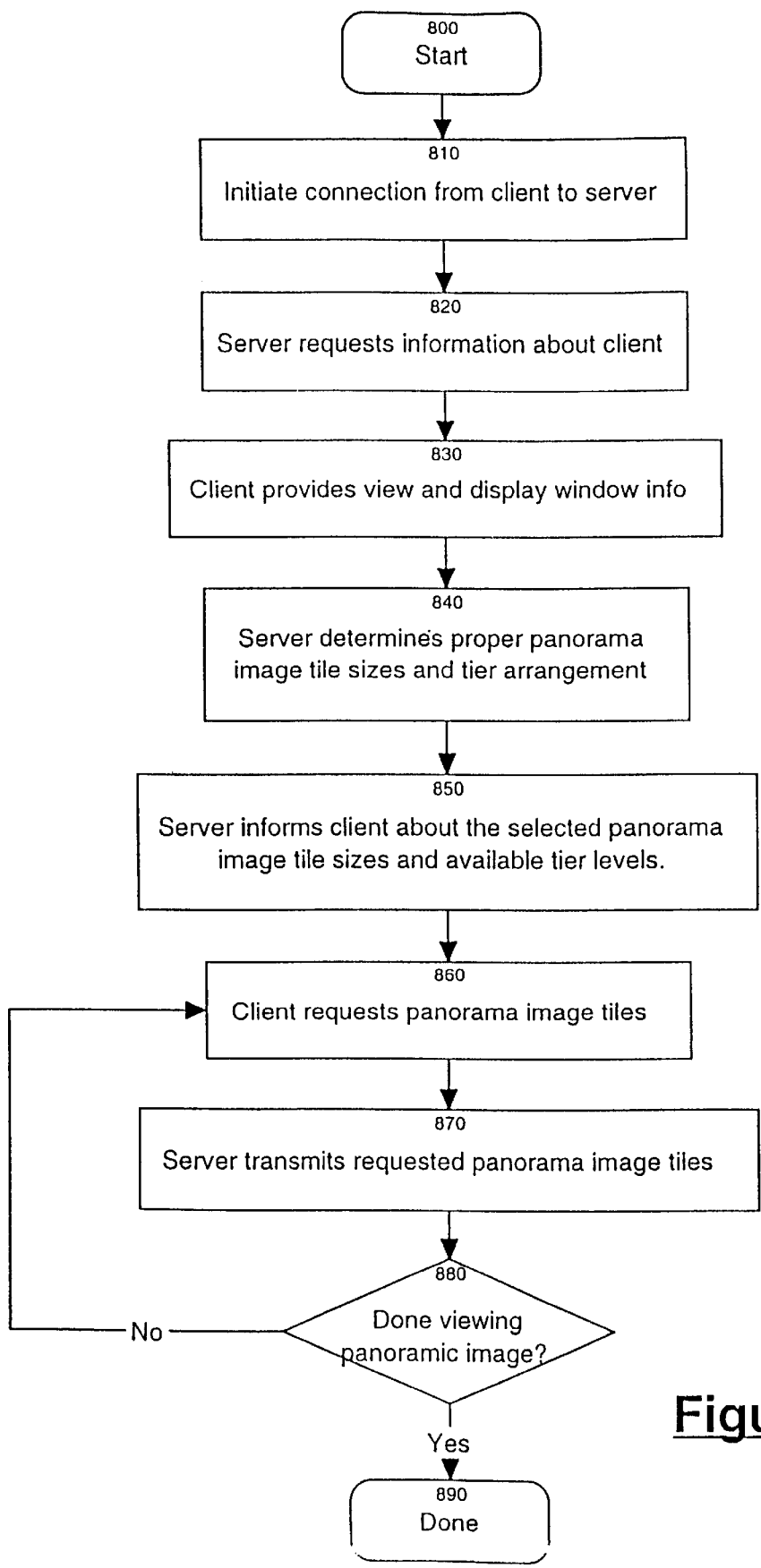
FIG. 8 illustrates a flow diagram that describes how a panoramic image client system negotiates a connection with a motion panoramic image server.
Figure 9:
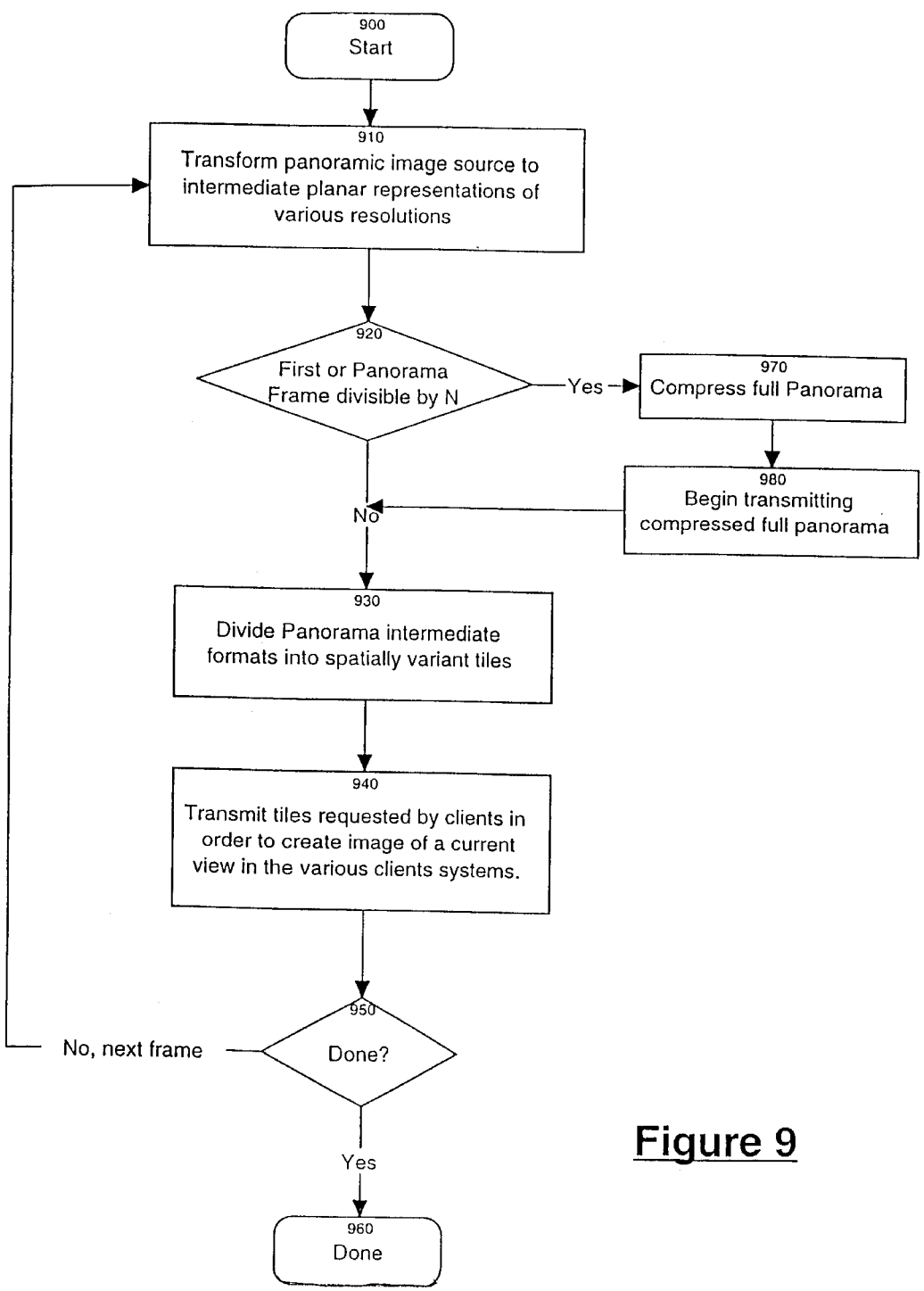
FIG. 9 illustrates a flow diagram that describes how a motion panoramic image server sends image tiles to a panoramic image client.

FIGS. 8 and 9 provide detailed flow diagrams that fully describe how the electronic image distribution system of FIG. 4 operates. FIG. 8 illustrates a flowchart describing one embodiment wherein a panoramic motion image server system and a client system negotiate a connection. However, it should be noted that in other embodiments, a standard connection can be used such that there is no negotiation of connection parameters. FIG. 9 describes how a server system transmits image tiles to a client system.

Client-Server Motion Panoramic Image Connection Negotiation

FIG. 4 illustrates one embodiment of a motion panoramic image client-server system wherein the bandwidth is conserved by dividing panoramic images into tiles. It should be noted that there is often not a "standard" server and client environment. Specifically, the clients, the server, and the network in a client-server environment may all vary depending on the circumstances. The capabilities of each different panoramic server system and each different panoramic client system would vary depending upon the system's specifications including the computer make, the processor type, the processor generation, the amount of random access memory available, the bus speed, and the operating system.

To most efficiently distribute motion panoramic images from a motion panoramic image server to clients, the present invention conducts a client-server negotiation. The server system determines the characteristics of the client before determining how the client-server system will operate. FIG. 8 illustrates a flow diagram describing the method of negotiating the client-server motion panoramic image connection.

Referring to FIG. 8, a client initiates a connection to a panoramic image server at step 810. Next at step 820, the panoramic image server requests information that describes the display characteristics of the client. Specifically, the server may request the client's frame buffer size, the client's frame buffer color characteristics, the size of the panoramic image view window, and other information relevant to the display of images on the client system. The motion panoramic image server may also request information describing the processing abilities of the client. For example, the panoramic image server may request the processor type, the processor speed, and the amount of main memory available. The client responds to the server's by sending this information to the motion panoramic image server at step 830.

At step 840, the motion panoramic image server uses the collected information to determine how the server will serve the client. One specific parameter that the server must decide is how to divide the unwrapped panoramic intermediate planar representation into tiles. Specifically, the size of the individual tiles will be determined. The motion panoramic image server may also determine the video frame-rate, a type of compression to use, and a processing-task division based upon the network connection speed and quality, the capabilities of the client system, and the current and anticipated processing load of the image server.

After determining the parameters of the motion panoramic image connection, the motion panoramic image server transmits the connection parameters to the client system at step 850. The client system will use the parameters to determine how the client system will display motion panoramic images.

After the client and server have negotiated the motion panoramic image connection, the client begins requesting motion panoramic image information from the server system at step 860. In response to the requests, the server begins transmitting motion panoramic image tiles to the client system at step 870. Since the connection to each client is uniquely calibrated, the server will transmit panoramic image information to each different client in a manner that is specific to that particular client. The server will continue transmitting motion panoramic images until the client requests the server to stop sending images at step 880.

Motion Panoramic Image Server Operation

FIG. 9 describes how the motion panoramic image server transmits the information needed to construct a view within a motion panoramic image on a client system. Thus, FIG. 9 describes in detail what occurs during the steps 860 and 870 of FIG. 8.

Referring to step 910 of FIG. 9, the first step that the motion panoramic image server must perform is transforming a panoramic image frame into one or more intermediate planar representations. The exact method of transforming a panoramic image frame is dependent on the type of camera system used. For example, a system built using the panoramic camera system of FIG. 1 would perform a geometric transformation to transform the annular panoramic image frame into the selected intermediate planar representation. If a fisheye lens panoramic camera system were used, a different geometric transformation would transform the distorted fisheye image into the desired intermediate planar representation. All subsequent actions are performed on the transformed intermediate planar representation.

In an embodiment with magnification, the source panoramic image data is transformed into more than one intermediate planar representation of different resolutions. For example, the source panoramic image data can be transformed into low, medium, and high-resolution intermediate planar representations as illustrated in FIGS. 5D, 5E and 5F.

After the panoramic image frame has been transformed into an intermediate planar representation, the method proceeds to step 920. At step 920, the method determines if a highly compressed version of the full panoramic image frame should be transmitted. As previously set forth, a highly compressed version of the full panoramic image frame is transmitted occasionally to handle sudden movements of the client's view. In one embodiment, the motion panoramic image server transmits a highly compressed version of the full panoramic image frame during first and every $N^{th}$ subsequent frame. Thus, during the first and every $N^{th}$ subsequent frame, the method proceeds to step 970 where the full panoramic image frame is compressed. Then, at step 980, the motion panoramic image server begins transmitting the highly compressed version of the full panoramic image frame. The transmission of the highly compressed version of the full panoramic image frame may occur all at once. Alternatively, the highly compressed version of the full panoramic image frame may be transmitted concurrently along with individual image tiles such that individual image tiles are not delayed.

Next, at step 930, the one or more intermediate planar representation frames are divided into individual tiles as illustrated in FIGS. 5D, 5E and 5F. The size of the individual tiles is the size that was negotiated during the connection process described in the flow diagram of FIG. 8.

After the frame has been divided into individual tiles, the server then fetches and transmits the tiles needed to create the client's view at step 940. Each tile is compressed before transmission to conserve bandwidth and decrease latency. The client will use the transmitted tiles to construct an image.

At step 950, the server method determines if the client system is done viewing the motion panoramic image. If the client is not done, the method proceeds back to step 960.

Motion Panoramic Image Server Operation

Figure 10:
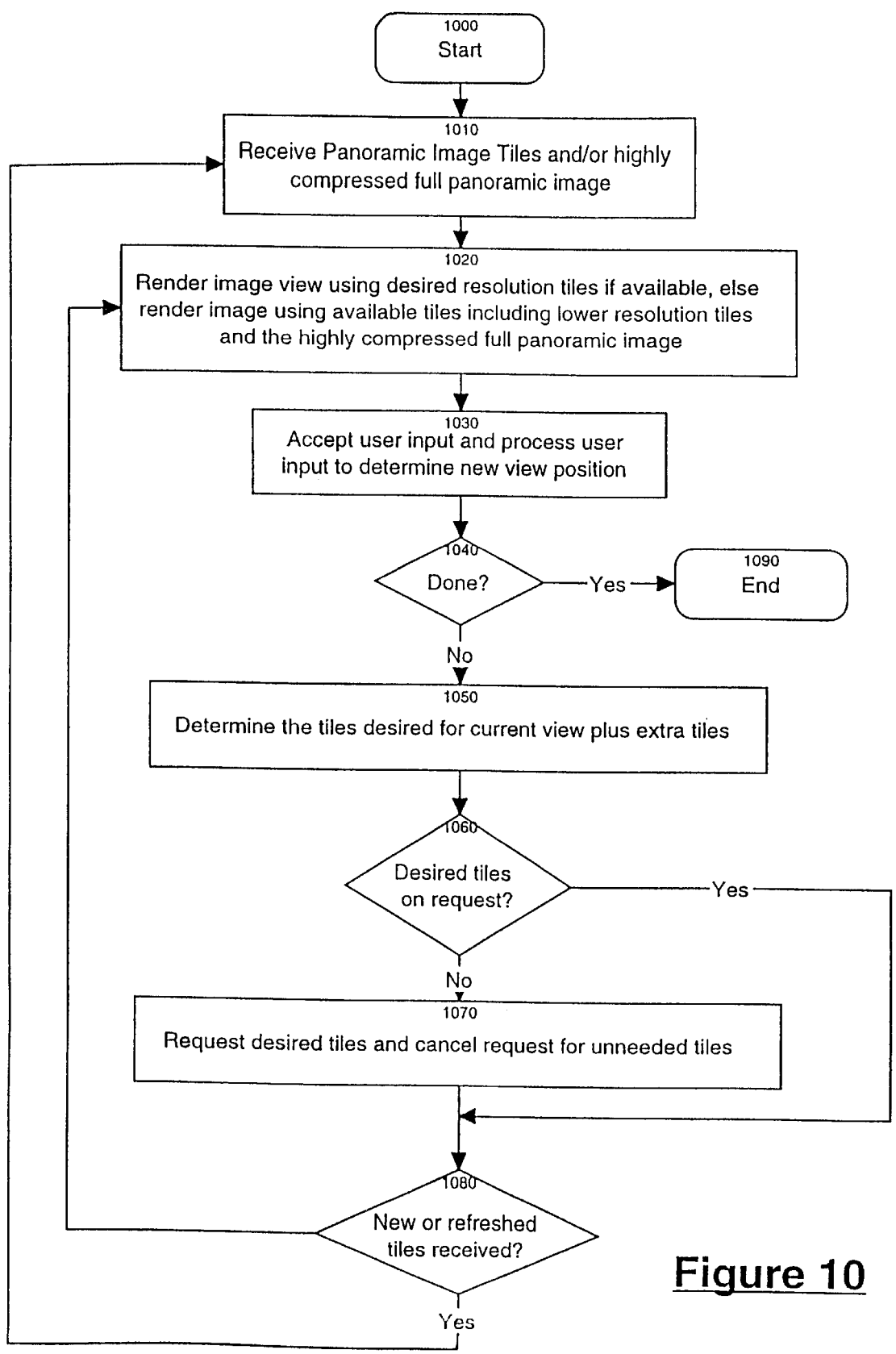
FIG. 10 illustrates a flow diagram that describes how a motion panoramic image client renders a panoramic image view using image tiles received from a server.

FIG. 10 illustrates a flow diagram describing a method that a client system may follow to receive information and render an image. It should be noted that FIG. 10 only illustrates one possible embodiment of a client system and that significant variations can be created. For example, several of the steps described in FIG. 10 such as receiving tiles and rendering an image may be performed concurrently. Alternatively, less processing could be performed in the client system and more processing could be performed in the server.

Referring to step 1010 of FIG. 10, the client receives any and all requested panoramic image tiles and highly compressed full panoramic images transmitted by the server. At step 1020, the client attempts to render an image for the current view position. Ideally, the view will be rendered with the tiles needed for the view. However, if the client does not have the desired tiles, then the client renders an image of the current view using the available tiles for the view, tiles from lower resolution tiers, and the most recently received version of the highly compressed full panoramic image.

After rendering an image frame, the client system accepts input from a user at step 1030. The client system may accept input, such as directional commands from a computer mouse, that pans the view within the panoramic image. The client may also accept commands that zoom-in and change the vertical viewing angle.

The client system then processes the user input to the server system at step 1030 to determine a next view position. At step 1040, the client system determines if the input specifies that the user is done viewing the panoramic image information. The client panoramic image-rendering program will terminate when the user no longer wishes to view the panoramic image.

At step 1050, the client system determines the frame tiles that are needed to create the new view position. The client system also determines if it should request tiles that are just out of the current view but are likely to be needed in the future. Specifically, the client determines if the current view is near the edge of a tile. If the client's view is near the edge of a tile, then the client will request tiles that are just outside of the client's current view. The tiles just out of view are requested such that if the client moves the view beyond the edge of the tile, then the client will be able to create a view without having to request and wait for the server to then send the needed tile. Thus, the client anticipates small view movements and is prepared to generate a view. However, if the user makes a sudden large view change, then the client rendering engine can always fall back to the highly compressed version of the full panoramic image.

Furthermore, at step 1050, the client system determines if any currently requested tiles are no longer needed. Tiles that are no longer needed consume valuable bandwidth such that the client system should unsubscribe from tiles that are no longer needed.

After determining the tiles needed for the current view, the client system determines at step 1060 if the needed tiles have already been requested and if there are no unnecessary tiles on request. If the needed tiles have already been requested and there are no unnecessary tiles on request, then the client system does not need to change the tile subscriptions. However, if new tiles are needed or currently subscribed tiles are no longer needed, then the client system sends a request to the server at step 1070 that changes the tile subscription.

At step 1080, the client system determines if any new frame tiles or compressed panoramic image frames have been received. If new frames have been received, then the method proceeds back to step 1010 to accept the new frames. Otherwise, the method proceeds back to step 1020 to render a new view image using the currently available tiles and the highly compressed full panorama image information. A different image may be generated from the same frame information if the user has shifted the view.

Overlapping Tile embodiment

Figure 11:
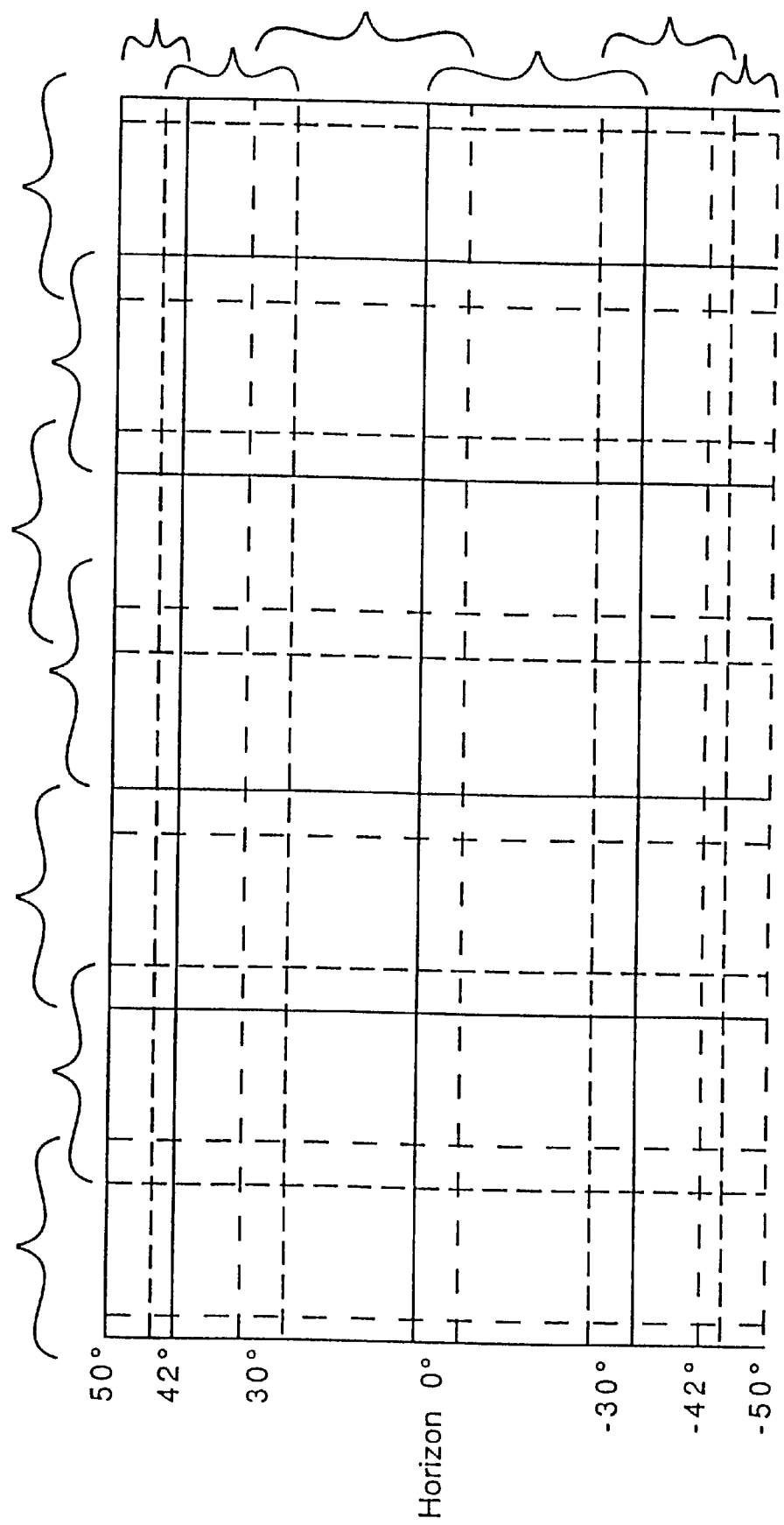
FIG. 11 illustrates a panoramic image frame in an intermediate planar representation that has been divided into overlapping tiles.

In one proposed embodiment, the panoramic image intermediate planar representation is divided into overlapping tiles. An example of this is provided in FIG. 11. By dividing the intermediate planar representation into overlapping tiles, a degree of hysteresis is provided such that small back and forth view changes will not cause the client system to oscillate requests for new tiles.

A Second Motion Panoramic Image Distribution System Embodiment

The selective tile transmission system described in the previous section provides a useful method of delivering motion panoramic image information in a unicast environment where each client receives a unique individual data stream. However, since the motion panoramic server must send out a unique data stream to each client, there will be a significant amount of redundant information being transmitted. To reduce the amount of redundant information being transmitted, the present invention also introduces a second multicast motion panoramic image serving system.

Figure 12:
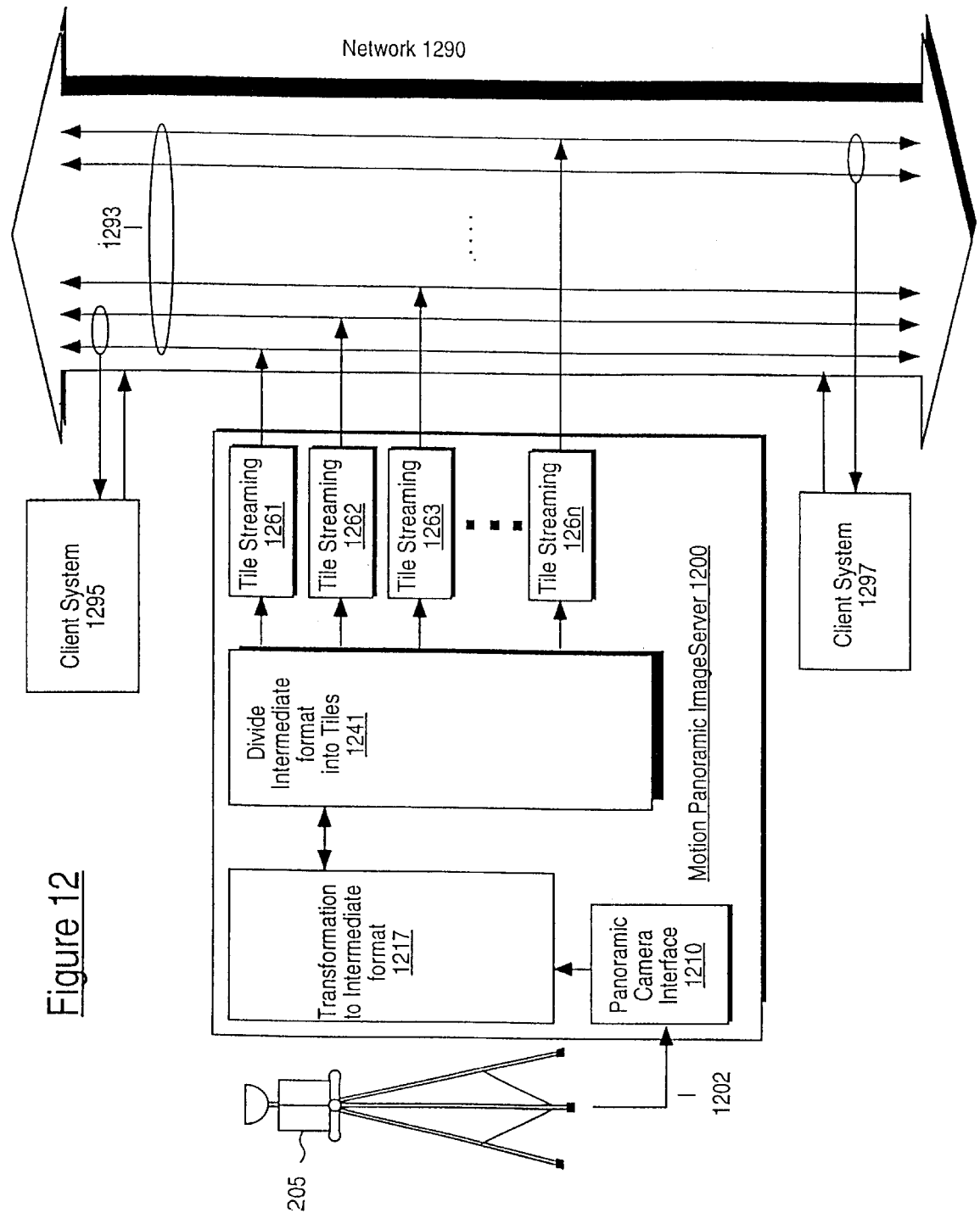
FIG. 12 illustrates a networked computer arrangement wherein a panoramic image server distributes motion panoramic image tiles on individual multicast channels.

FIG. 12 illustrates a multicast motion panoramic image serving system constructed according to the teachings of the present invention. In the system of FIG. 12, a motion panoramic camera system 1205 delivers a series of high-resolution panoramic images across a high bandwidth link 1202 to a motion panoramic server 1200. A Panoramic Camera Interface 1210 handles the communication with the motion panoramic camera system 1205. A transformation unit 1217 transforms the raw panoramic image frames into an intermediate planar representation. As previously set forth, two possible intermediate planar representations are cylindrically encoded intermediate planar representation and spherically encoded intermediate planar representation.

After a panoramic image frame has been transformed into an intermediate planar representation, the intermediate planar representation is divided into individual tiles by unit 1241. After dividing the intermediate planar representation into individual tiles, a set of tile streaming units 1261, 1262, 1263, ... 126n transmit the tiles on multicast channels 1293 on a high bandwidth network 1290. Specifically, each tile position is assigned its own multicast channel.

To display a view within a motion panoramic image, each client system subscribes to the multicast channels that carry the tiles needed to construct the desired view. For example, client system 1295 needs the two tiles delivered by tile streaming units 1261 and 1262 such that client system 1295 subscribes to the multicast channels transmitted by those tile streaming units.

Figure 13:
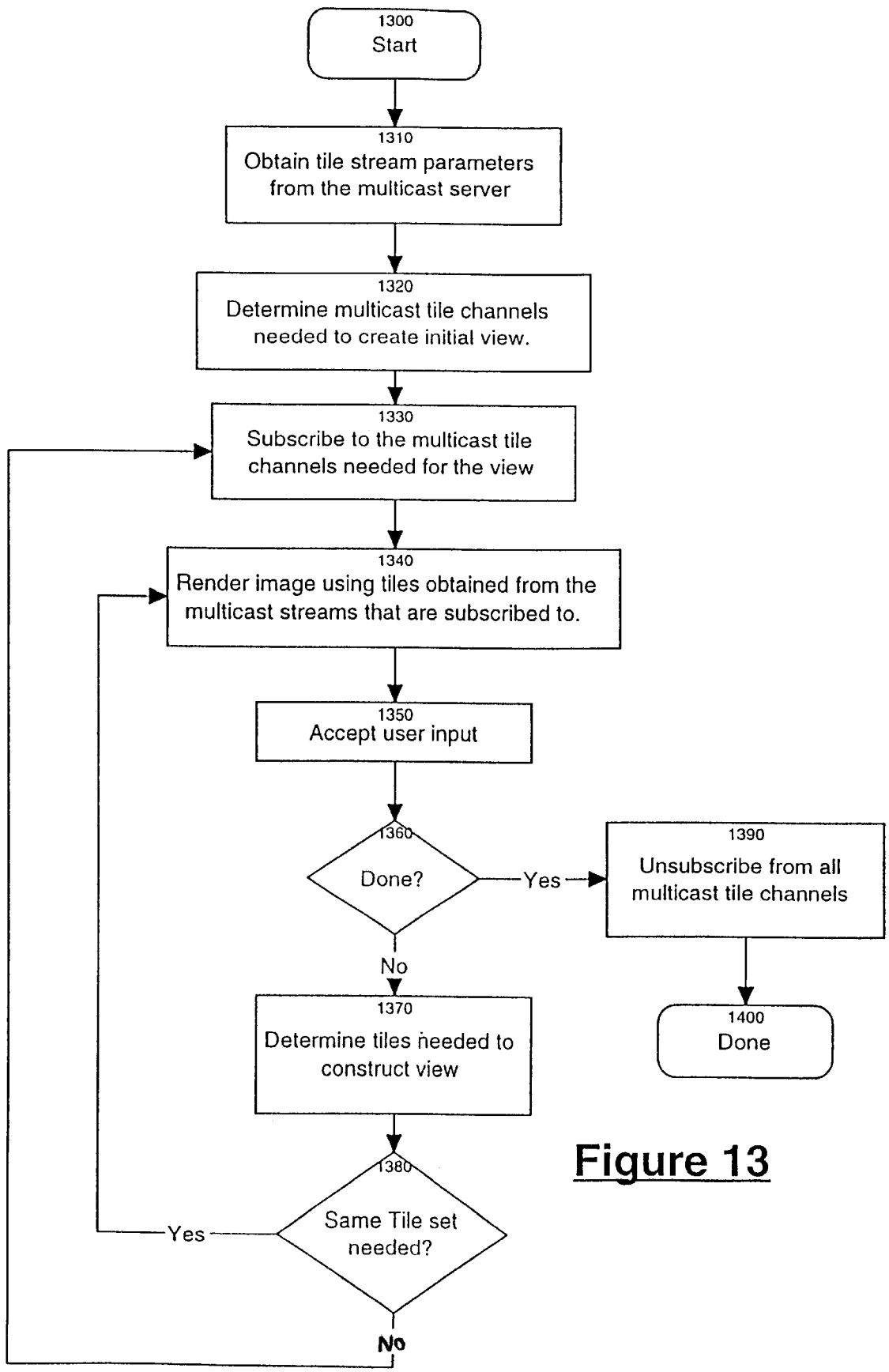
FIG. 13 illustrates a flow diagram that describes how a motion panoramic image client subscribes to multicast panoramic image tile channels and renders an image using received image tiles.

FIG. 13 provides a flow diagram that describes one possible method that a client system may follow to render a view from a motion panoramic server constructed according to the teachings of FIG. 12. Initially, at step 1310, the client system subscribes to the multicast panoramic tile channels necessary to render a view from an initial view location. Routers and switches that couple the client system to a main multicast backbone will perform the necessary operations in order to begin delivering the subscribed multicast panoramic tile channels.

Next, at step 1320, the client system will render an image of the current view using the information from the subscribed multicast panoramic tile channels. It should be noted that other client systems will share the same multicast channels such that bandwidth is conserved.

At step 1330, the client system accepts input from the user. The client system may accept input, such as directional commands from a computer mouse, that pans and tilts the user's view within the motion panoramic image.

After accepting the user's input, the client system analyzes the user's input. If the user has indicated that he is done viewing the motion panoramic image at step 1340, then the client system unsubscribes from all the multicast tile channels and will stop displaying images as set forth in step 1370.

If the user's input changes the position of the view within the motion panoramic image, then the client system determines the tiles that will be necessary to render the new view position at step 1350. Specifically, referring back to FIG. 5, the client system determines which tiles comprise the current view location. At step 1360, the client determines if only the same tiles that are already subscribed to are needed. If so, then the method proceeds back to step 1320 to render a subsequent image view frame.

If different tiles are needed, the client system proceeds to step 1310. At step 1310, the client system subscribes to the multicast tile channels needed to render the current view.

Figure 14:
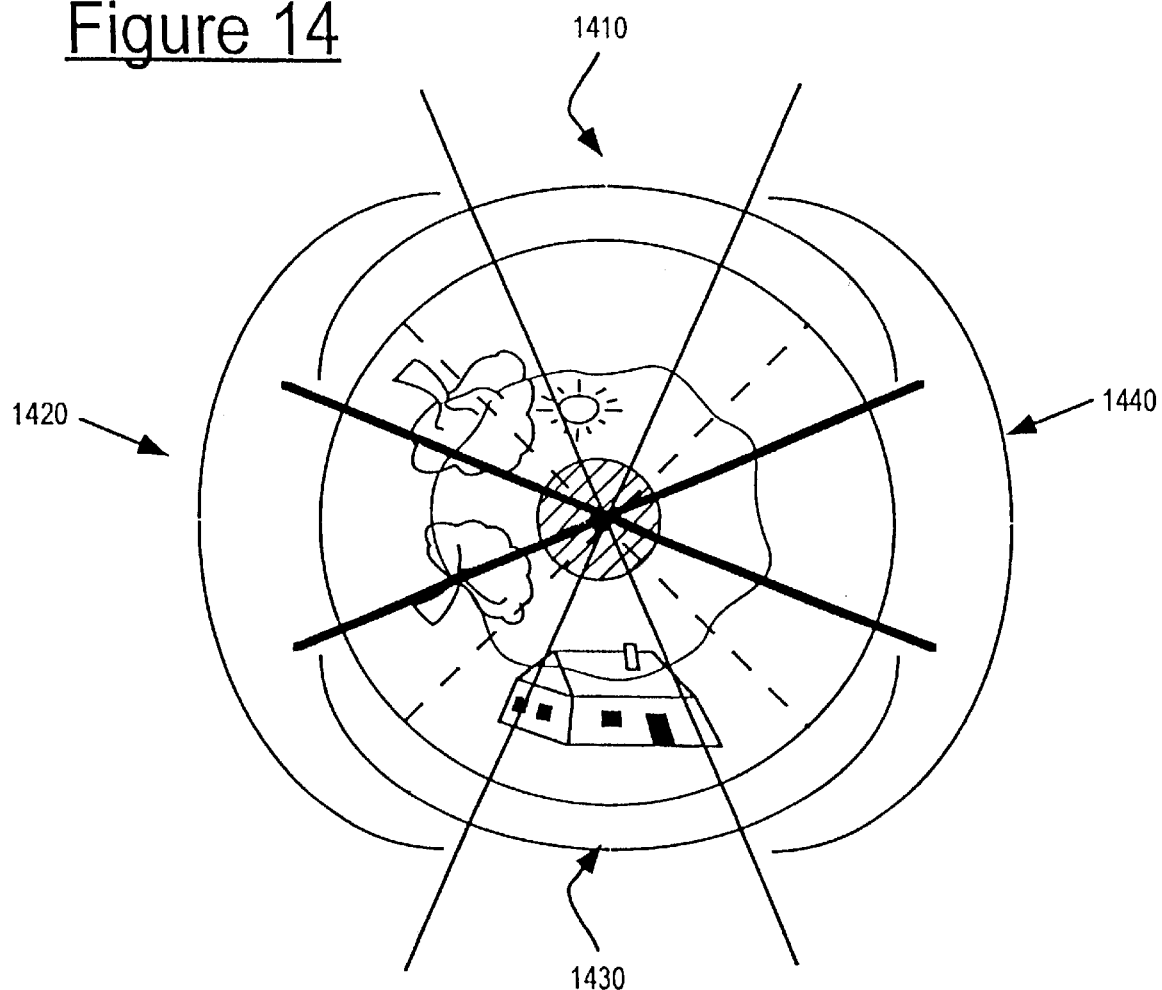
FIG. 14 illustrates a panoramic annular image divided into quadrants that are served on different multicast channels.

To limit the number of multicast channels used, the number of tiles that the panoramic image is divided into should be kept small. FIG. 14 illustrates one possible way of dividing the original source panorama. In the embodiment of FIG. 14, the source panorama is divided into four quadrants: an upper quadrant, a left quadrant, a right quadrant, and a lower quadrant. (The quadrants are illustrated using dotted lines.) Each quadrant becomes the source of a multicast channel. Thus, only four multicast channels are required.

To handle pans of the user's view, the information supplied for each quadrant should overlap the other quadrants such that only one multicast channel needs to be subscribed to. Ideally, the overlap area will be at least as large as a client view. Referring to FIG. 14, a set of overlapping quadrants are displayed: overlapping upper quadrant 1410, overlapping left quadrant 1420, overlapping lower quadrant 1430, overlapping right quadrant 1440.

If very fast pans occur, the multicasting embodiment may also include a highly compressed full panoramic image channel. The highly compressed full panoramic image channel would occasionally transmit a highly compressed version of the full panoramic image such that a view in any direction could be created.

To divide the processing that must be performed, multiple servers may be used. For example, a first server could generate and serve the multicast channel carrying the overlapping upper quadrant 1410, a second server could generate and serve the multicast channel carrying the overlapping left quadrant 1420, and so on.

Figure 15:
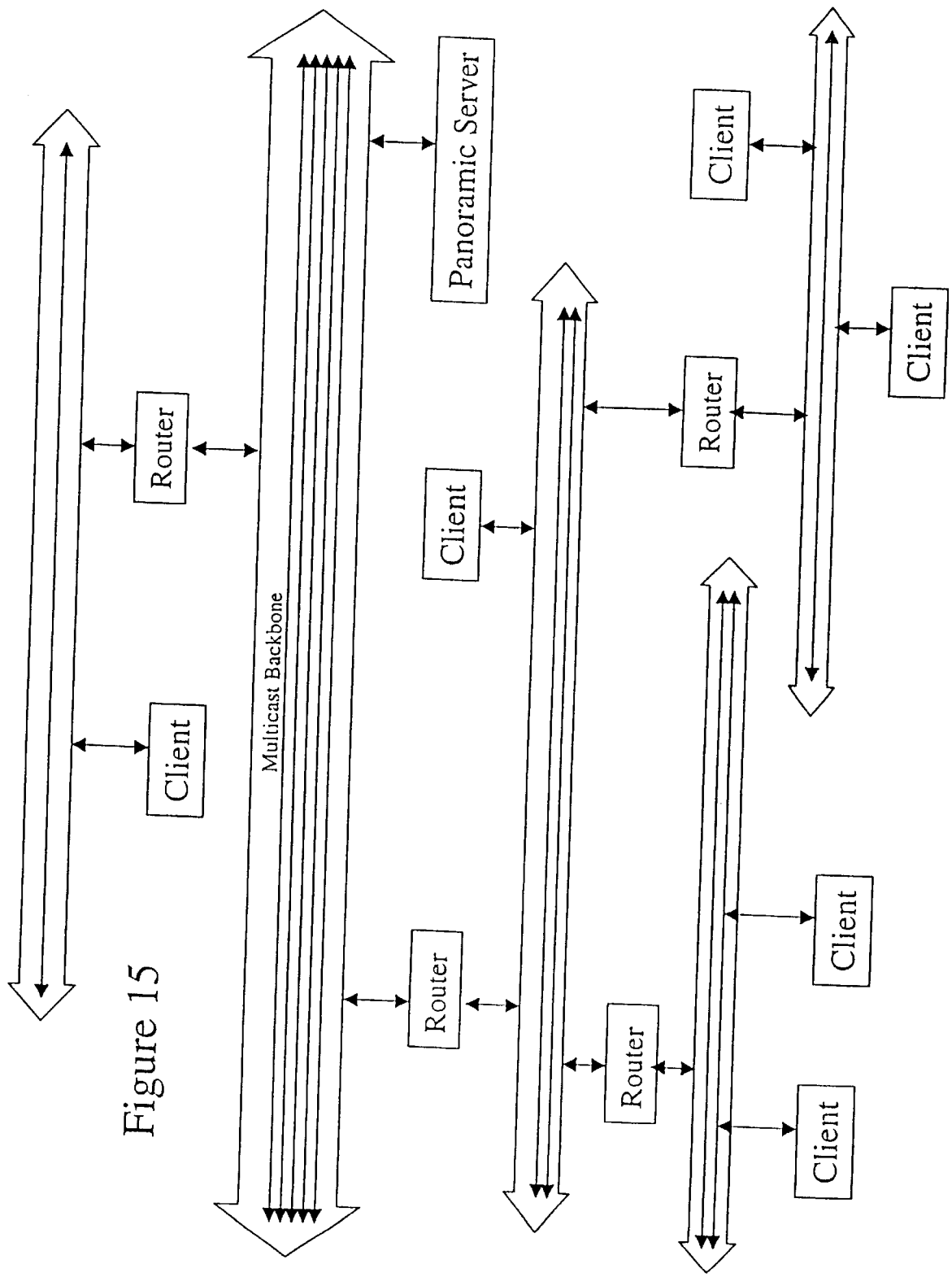
FIG. 15 illustrates a panoramic image server that transmits panoramic image information on different multicast channels on a multicast backbone, and client systems that subscribe to the multicast channels.

FIG. 15 graphically illustrates how network bandwidth is conserved using a multicast type of system. Specifically, a panoramic image server transmits all the tile channels on a multicast backbone. Various routers coupled to the multicast backbone only route multicast channels subscribed to by clients connected to their subnetworks. By routing only the multicast channels needed by clients connected to their subnetworks, the routers limit the tile information carried by the subnetworks.

Tiered Quality Tiles

This aspect of the invention addresses one difficulty related to techniques for panning a view over a motion panorama. As the view is panned over the panorama (for example, by a user manipulating a control), a tradeoff occurs between limiting the maximum allowable pan rate and the amount of data that is kept to render the view when shifted by the pan operation. If unlimited bandwidth is available, the entire panorama could be delivered to the client computer for every frame in the motion panorama, there would be no need to limit the pan rate, and the view would always be presented at the desired quality.

The amount of bandwidth consumed to send such a panorama over an unlimited bandwidth link is a function of the resolution of the panorama, the size of the panorama and the frame rate for updating the panorama.

Where the link has limited bandwidth (such that the entire panorama cannot be sent at the desired resolution, size and frame rate because of the limited bandwidth), techniques can be used to allocate the available bandwidth to provide a quality view into the panorama, while still making lower-quality portions of the panorama available if required for a pan operation. This approach can result in significant temporal and edge distortion when the viewpoint is panned into the lower-quality portion of the received panorama. Some of these distortions occur when the view is being generated using data from different quality tiles and can result in temporal tearing and other presentation artifacts.

The previously described techniques (such as occasionally transmitting a highly compressed (low-quality) version of the panoramic image) tend to waste the available bandwidth because data representing portions of the panorama that are not expected to be viewed is still sent on the off-chance that the view could be panned to an unexpected portion of the panorama. Thus, if these portions of the panorama are not needed the bandwidth used to send them is wasted.

A preferred embodiment allocates the available bandwidth such that the available tile quality is a function of the distance the tile is from the current viewpoint. The tile quality is determined by the amount of compression (or other characteristics of the tiles) applied to each tile. Thus, tiles that are adjacent to the viewpoint and used to render the view are less compressed to create a high-quality presentation of the view. Other tiles will be more highly compressed (thus, only able to present a lower quality view) responsive to the distance the tile is from the viewpoint.

One skilled in the art will understand that many techniques can be used to create tiles of differing quality. Each "tier" consists of tiles that have a particular quality. The quality is determined by characteristics such as the resolution of the portion of the image represented by the data in the tiles of the tier, the frame rate for sending the data defined by a tile, the amount of compression applied to the data in the tile, and the amount of the color information maintained in the tile's data, along with other characteristics. A tier set is a collection of tiers that are encoded so as to balance the quality of the presentation of the tiles within the tier set with the bandwidth required to send the tile data. The creation and use of "tiers" is subsequently described.

In addition, one skilled in the art will understand that many techniques exist to allocate the bandwidth between two data channels. These include, but are not limited to, sending multiple data streams at the same time (such as a mixed signal having two different data channels within the available bandwidth), or time-slicing the data channels onto a single communication link.

Figure 16A:
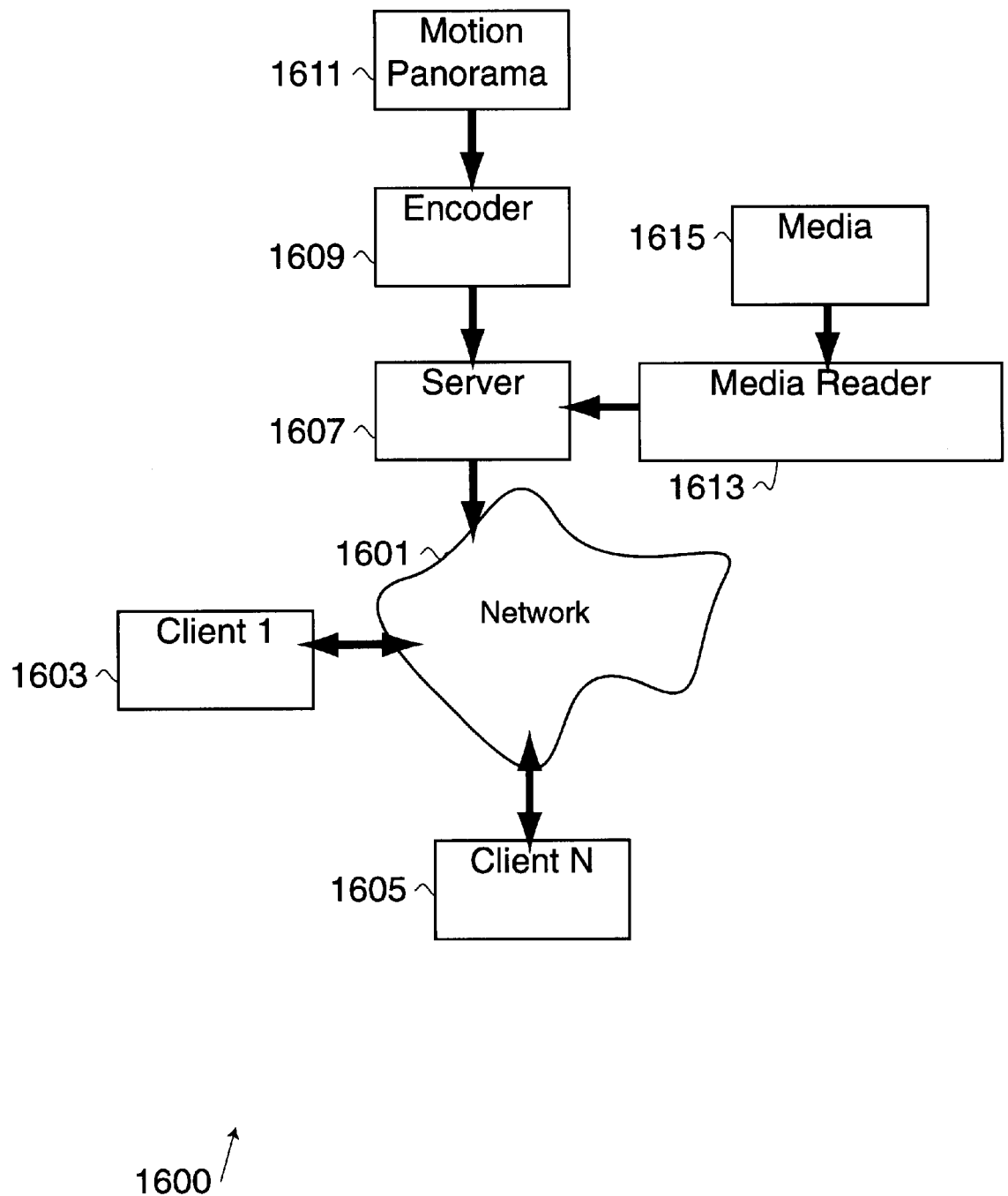
FIG. 16A illustrates an overview of the architecture of one preferred embodiment.

FIG. 16A illustrates a computer system 1600 that includes a network 1601 used by at least one client computer, such as a first client computer 1603 and an $n^{th}$ client computer 1605, to communicate with a server computer 1607. The server computer 1607 receives information from an encoder array 1609 over a high-speed link. The encoder array 1609 receives a motion panorama image input 1611 and compresses the motion panorama image input 1611 into a number of tiered tiles of differing quality as is subsequently described.

One skilled in the art will understand that the high-speed link can be a network connection, an internal computer bus, or any technology for rapidly transferring data from the encoder array 1609 to the server computer 1607.

The computer system 1600 can also include a media reader 1613 that can access tiles that are already encoded, tiered and tiled and that are resident on computer readable media such as a DVD media 1615 or other suitable media.

The operation of the computer system 1600 is that the motion panorama image input 1611 is provided to the encoder array 1609 on a frame-by-frame basis. The encoder array 1609 compresses the motion panorama image input 1611 to generate the tier and tile structure subsequently described and sends this information to the server computer 1607. The server computer 1607 receives subscriptions to the differing quality tiles from the first client computer 1603 and/or the $n^{th}$ client computer 1605. The tile subscriptions need not be the same for each of the clients. The server computer 1607 distributes the subscribed-to tiles to the clients over the network 1601. The server computer 1607 can also access prerecorded tiers and tiles using the media reader 1613 to read a computer readable media such as the DVD media 1615.

Figure 16B:
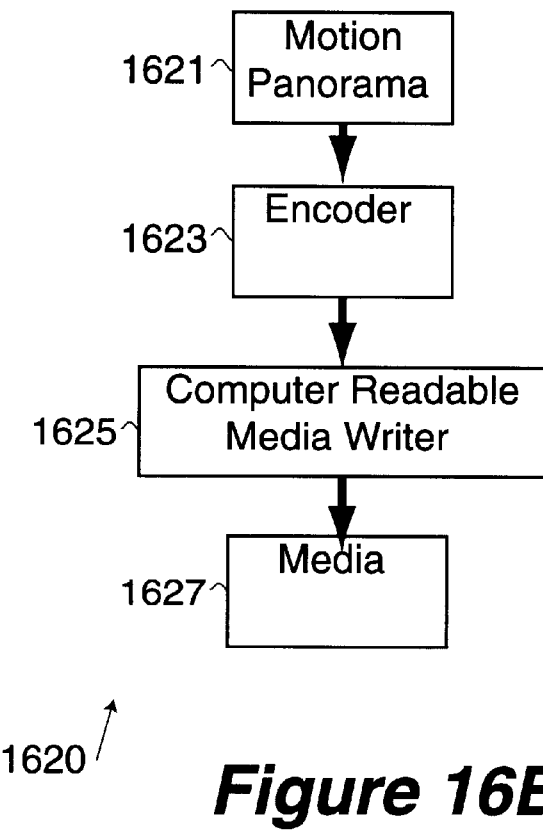
FIG. 16B illustrates an apparatus to store a motion panorama image on a computer readable media according to a preferred embodiment.

FIG. 16B illustrates a DVD media creation system 1620 that receives a motion panorama image input 1621 at an encoder array 1623 to generate the tiered and tiled information that is transferred to a DVD drive 1625 configured to write the tiered and tiled information onto a DVD media 1627. One skilled in the art will understand that other suitable media and media drivers can be used other than the DVD drive 1625 and the DVD media 1627.

Figure 16C:
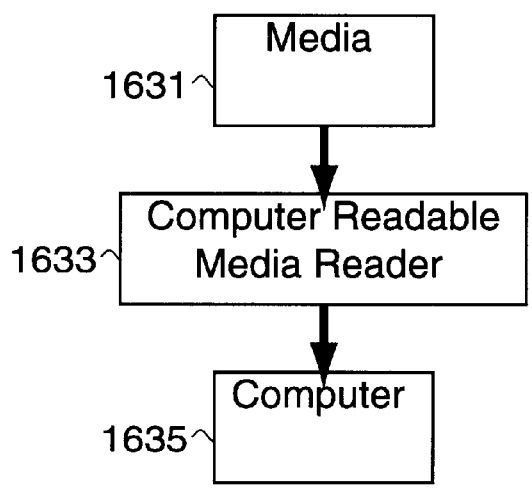
FIG. 16C illustrates an apparatus to read a motion panorama image from a computer readable media according to a preferred embodiment.

FIG. 16C illustrates an apparatus 1630 that can read tiered and tiled information from a DVD media 1631 using a DVD drive 1633 under control of a computer system 1635. The computer system 1635 can present the accessed information as is subsequently described. In addition other suitable media and media drivers can be used.

Figure 17:
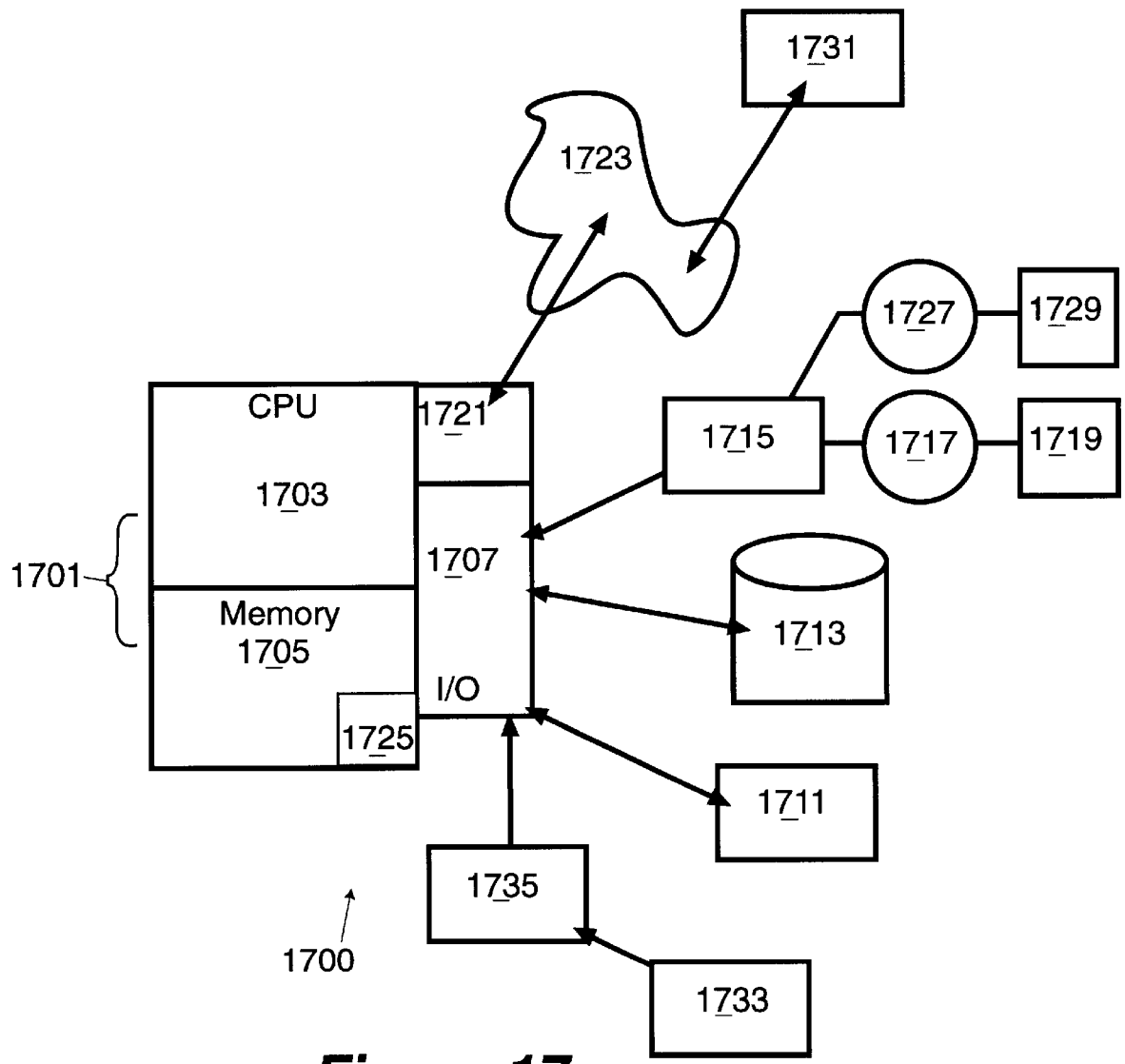
FIG. 17 illustrates a computer system capable of using the invention in accordance with a preferred embodiment.

FIG. 17 illustrates a computer system, indicated by general reference character 1700, that incorporates the invention. The computer system 1700 includes a processor 1701 that includes a central processor unit (CPU) 1703, a memory section 1705 and an input/output (I/O) section 1707. The I/O section 1707 is connected to a user interface 1711, a disk storage unit 1713 and a DVD/CD-ROM drive unit 1715. The DVD/CD-ROM drive unit 1715 can read a CD-ROM medium 1717 that typically contains a program and data 1719. The DVD/CD-ROM drive unit 1715 (along with the CD-ROM medium 1717) and the disk storage unit 1713 comprise a file storage mechanism. Some embodiments of the invention include a network interface 1721 that connects the computer system 1700 to a network 1723. Portions of the program and data 1719 can be resident in a program memory 1725 for execution by the CPU 1703. A DVD medium 1727 contains tired and tiled motion image data 1729 that can be read by the DVD/CD-ROM drive unit 1715 for presentation by the user interface 1711, other presentation device, or a display device. A client computer 1731 can also access tier and tile information through the network 1723. In addition, motion images can be collected by a video camera 1733 and processed by a video encoder array 1735 to directly create the tier and tile information in real time. One skilled in the art will understand that not all of the displayed features of the computer system 1700 are required in some of the embodiments.

Figure 18:
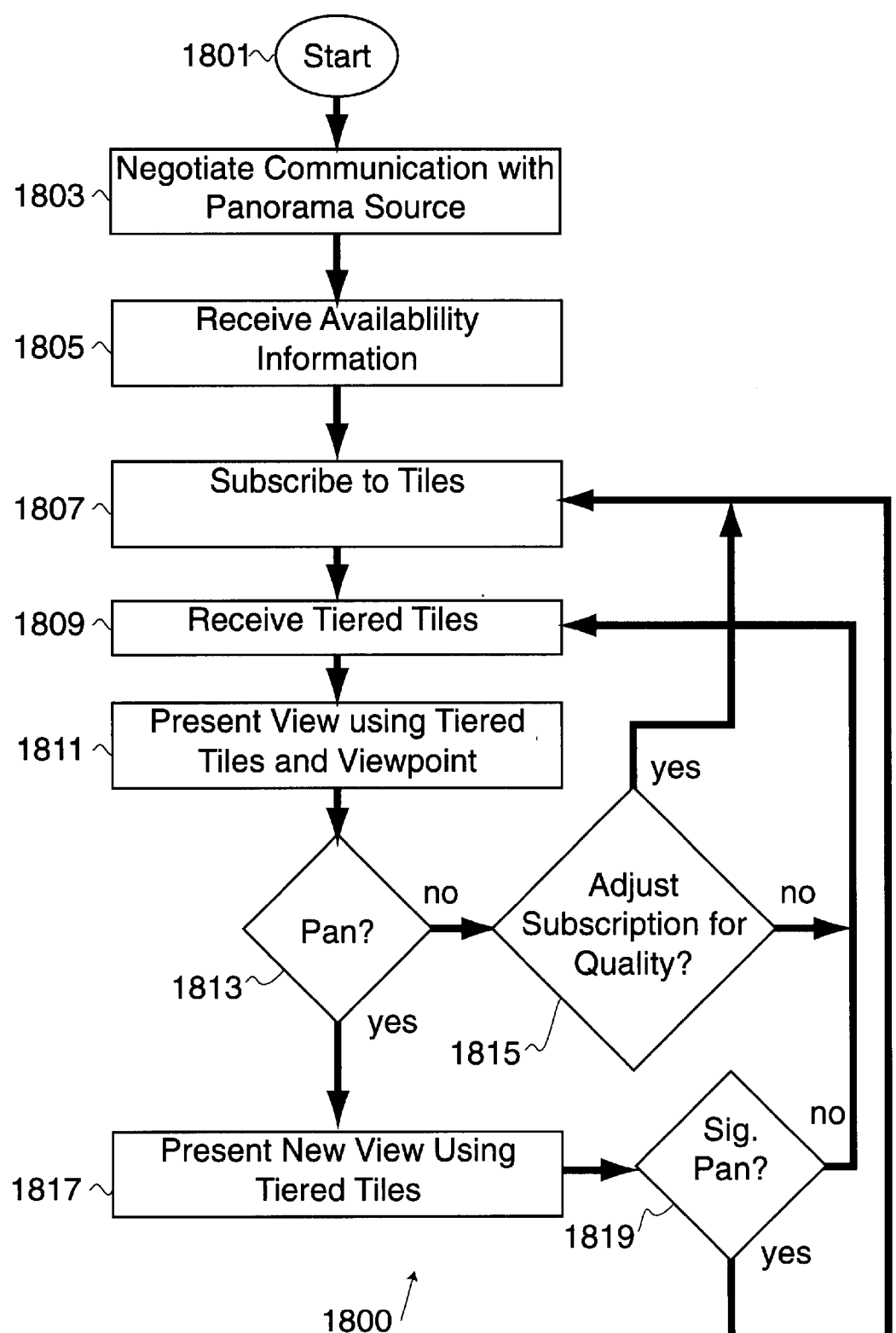
FIG. 18 illustrates a process of presenting a view into a panoramic source in accordance with a preferred embodiment.

FIG. 18 illustrates a presentation process 1800 that can be used by a computer to present a view into a panorama. The presentation process 1800 initiates at a 'start' terminal 1801 and continues to a 'negotiate communication' procedure 1803. The 'negotiate communication' procedure 1803 communicates with the source of the panoramic image to determine the bandwidth available for transferring data representing the panorama to the computer. In one preferred embodiment this process determines the expected bandwidth between a networked panoramic image source and a client computer executing the presentation process 1800. In a second preferred embodiment the 'negotiate communication' procedure 1803 determines the available bandwidth (communication speed) between a device (such as the DVD/CD-ROM drive unit 1715 or the media reader 1613), used to access media containing the panoramic image, and the computer executing the 'negotiate communication' procedure 1803.

A 'receive availability information' procedure 1805 obtains availability information from the panorama source that represents the available tiers and tiles that can be provided by the panorama source. A 'subscribe to tiles' procedure 1807 uses the availability information, the viewpoint into the panoramic image, and the bandwidth (as found by the 'negotiate communication' procedure 1803) to determine a tile subscription for the computer. The 'subscribe to tiles' procedure 1807 can also specify that not all frames are to be sent for a subscribed-to tile (thus, skipping frames for that tile). A 'receive tiered tiles' procedure 1809 receives the data from the subscribed-to tiles. This data is used to present a view into the panorama by a 'present view' procedure 1811.

The presentation process 1800 continues to a 'pan operation' decision procedure 1813 that detects whether the viewpoint into the panorama has changed (for example, by a "pan" operation) or whether the viewpoint has remained substantially constant for a period of time (thus implying that the user is interested in the presented view and is relatively less likely to pan beyond the corresponding tile(s) representing the current view).

If the viewpoint has not changed, the presentation process 1800 continues to an 'adjust subscription for quality' decision procedure 1815 that can adjust the tile subscription to increase (or reduce) the quality of the presented view. An increase in quality can be accomplished by selecting a less compressed tile, by increasing the frame rate of the tile, by increasing the amount of color information provided with the original data (the color depth), by increasing the presented resolution, by increasing the size of the view, by adjusting the field of view, and/or by other mechanisms well understood by one skilled in the art. If the 'adjust subscription for quality' decision procedure 1815 determines that the quality need not be adjusted, the presentation process 1800 continues to the 'receive tiered tiles' procedure 1809. However, if the quality is to be adjusted, the presentation process 1800 continues to the 'subscribe to tiles' procedure 1807 that adjusts the tile subscription accordingly.

However, if the viewpoint changed at the 'pan operation' decision procedure 1813, the presentation process 1800 continues to a 'present new view' procedure 1817. The 'present new view' procedure 1817 presents a new view based on the new viewpoint and possibly using reduced-quality tiles.

The presentation process 1800 then continues to a 'significant pan operation' decision procedure 1819 that determines whether the viewpoint change caused the view to be presented using data from reduced-quality tiles (or is likely to do so in the near future). If so, the pan operation was a "significant pan operation" and requires a change to the tile subscription so as to receive high-quality tiles containing data for the presented view. In this instance, the presentation process 1800 continues to the 'subscribe to tiles' procedure 1807 to make this change.

However, if the 'significant pan operation' decision procedure 1819 determines that the pan operation was not significant, the presentation process 1800 continues to the 'receive tiered tiles' procedure 1809 to receive the data from the subscribed-to tiles for the next frame.

The 'significant pan operation' decision procedure 1819 can be implemented in various ways. In one preferred embodiment, the 'significant pan operation' decision procedure 1819 monitors whether the pan operation has moved the viewpoint such that the generation of the view uses data from a tile belonging to a lower-quality tier. Another preferred embodiment uses a predictor to predict that the viewpoint will soon require a tile belonging to a lower-quality tier to generate the view and thus, subscribe to higher-quality tiles for the expected view. Other prediction techniques known in the art can be used.

The 'adjust subscription for quality' decision procedure 1815 monitors changes in the viewpoint. If the viewpoint remains in a high-quality tier for a sufficient period (that is, when the viewpoint becomes stable), the 'adjust subscription for quality' decision procedure 1815 can change the tile subscription to optimize the bandwidth use to increase the quality of the presented view. Examples of this would be to subscribe to tiles that have a higher frame rate or to subscribe to tiles that are less compressed.

The presentation process 1800 can also detect when the viewpoint is likely to move out of the area of the panorama that has high-quality tiles and thus likely to require the view to be generated from data in a tile belonging to a lower-quality tier. The viewpoint stability can be determined by monitoring the viewpoint's history, predicting that the viewpoint into the panorama will change and that this change would cause the view to be generated using lower-quality tiles. In addition, the stability can be determined by monitoring how much the viewpoint has changed over a period of time. Other techniques well known in the art can also be used.

The 'present new view' procedure 1817 uses data from existing tiles to generate the new view after the viewpoint has changed. If the viewpoint has changed such that tiles from lower-quality tiers are needed to generate the view, the 'present new view' procedure 1817 presents the view from this data. This results in a lower-quality presentation until the newly subscribed-to tiles belonging to a high-quality tier are received at the 'receive tiered tiles' procedure 1809. Although the view is always presented, the quality of the presentation may be temporarily reduced and may include temporal and/or spatial tearing or other quality artifacts.

FIG. 19 illustrates an example tile subscription 1900 having a quality axis 1901 and a tile angle axis 1903. In this space, there are eight tiles in three tiers. Tier-3 tiles 1905, 1913, 1915, 1917, 1919 are the tiles that have the least quality data as indicated by the wide hashing in these tiles. Tier-2 tiles 1907, 1911 have better quality than the tier-3 tiles 1905, 1913, 1915, 1917, 1919 but less quality than a tier-1 tile 1909. In this illustration, each of the tiles 1905, 1907, 1909, 1911, 1913, 1915, 1917, 1919 subtends 45 degrees of the panorama. Thus, a 360-degree panorama is represented by the data in the eight tiles 1905, 1907, 1909, 1911, 1913, 1915, 1917, 1919. The tier-1 tile 1909 includes the highest quality data such that presentation of the view from the tier-1 tile 1909 provides the best quality. If presentation of the view requires data from the other tiles, the viewer of the presentation will possibly notice temporal and/or spatial tearing. One skilled in the art will understand that: multiple tiles can be within each tier; that different angular widths can be used with each tile, and that the subscribed tiles can be distributed as has been previously described.

Figure 20A:
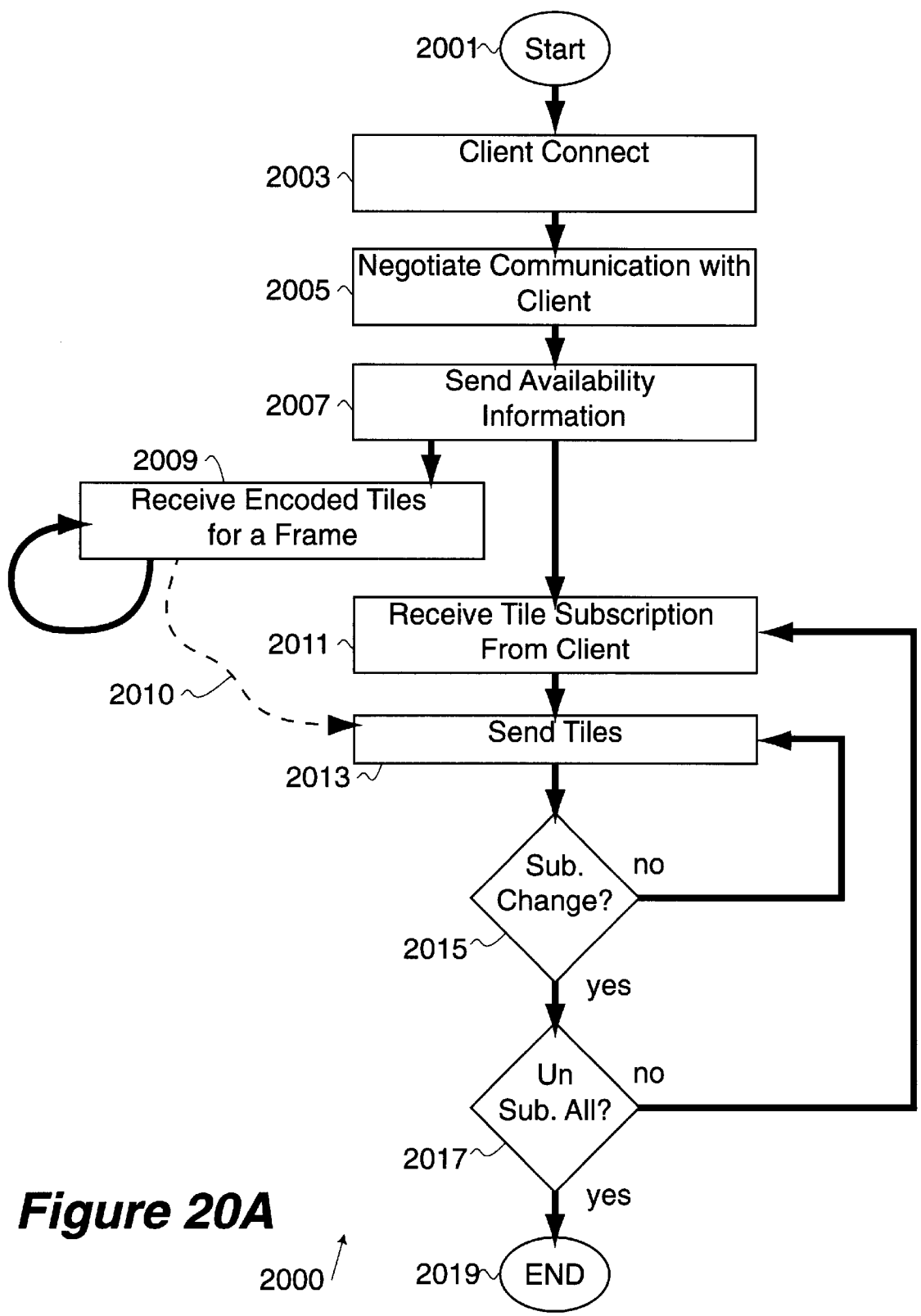
FIG. 20A illustrates a process of sending tiles from a server in accordance with a preferred embodiment.

FIG. 20A illustrates a server process 2000 that can be used by the server computer 1607 to distribute tiles to one or more clients (for example, the $n^{th}$ client computer 1605). The server process 2000 initiates at the 'start' terminal 2001 and continues to a 'connect with client' procedure 2003 that recognizes when a client computer requests a connection with the server computer 1607 and performs the functions required to satisfy this request. Once the server computer 1607 and the client have established communication, the server process 2000 continues to a 'negotiate communication' procedure 2005. The 'negotiate communication' procedure 2005 is the server side of the communication negotiation of the 'negotiate communication' procedure 1803 performed by the client and previously discussed with respect to FIG. 18.

A 'send availability information' procedure 2007 sends availability information to the client computer. The availability information includes the characteristics and quality of the available tiers and the available tiles within the tiers. The client uses this information during the 'subscribe to tiles' procedure 1807 previously described.

A 'receive encodings for frame' procedure 2009 receives a tiered and tiled frame of data from the encoder array 1609 or by reading the DVD media 1615. This procedure continues for so long as frames are available from the panorama source or until otherwise terminated. The 'receive encodings for frame' procedure 2009 provides a 'frame received' signal 2010 to indicate when the received tiles can be sent to a client.

A 'receive tile subscription' procedure 2011 receives the tile subscription from the client computer. In one preferred embodiment, the tile subscription for each client is used to determine which tiles that are received from the encoder array 1609 are to be sent to each client. In another preferred embodiment, the tile subscription is used to select which tiles are to be broadcast on the multicast channels. A 'send tiles' procedure 2013 sends the subscribed-to-tiles to the clients that have subscribed to them. The subscribed-to-tiles are sent responsive to the 'frame received' signal 2010. Thus, as new encoded data arrives from the encoder array 1609, tiles containing portions of that data are sent to the client computers according to the tile subscription information provided by the client.

A 'subscription changed' decision procedure 2015 detects whether a client has changed the tile subscription. If the tile subscription for a particular client (or multicast channel) has not changed, the server process 2000 continues to the 'send tiles' procedure 2013 to send the subscribed-to-tiles for the next frame. However, if the client changed its tile subscription, the server process 2000 continues to a 'subscription terminated' decision procedure 2017 to determine if all tiles are unsubscribed. If all tiles have been unsubscribed, the server process 2000 completes through an 'end' terminal 2019. Otherwise, the server process 2000 continues to the 'receive tile subscription' procedure 2011 to update the tile subscription for the client.

Figure 20B:
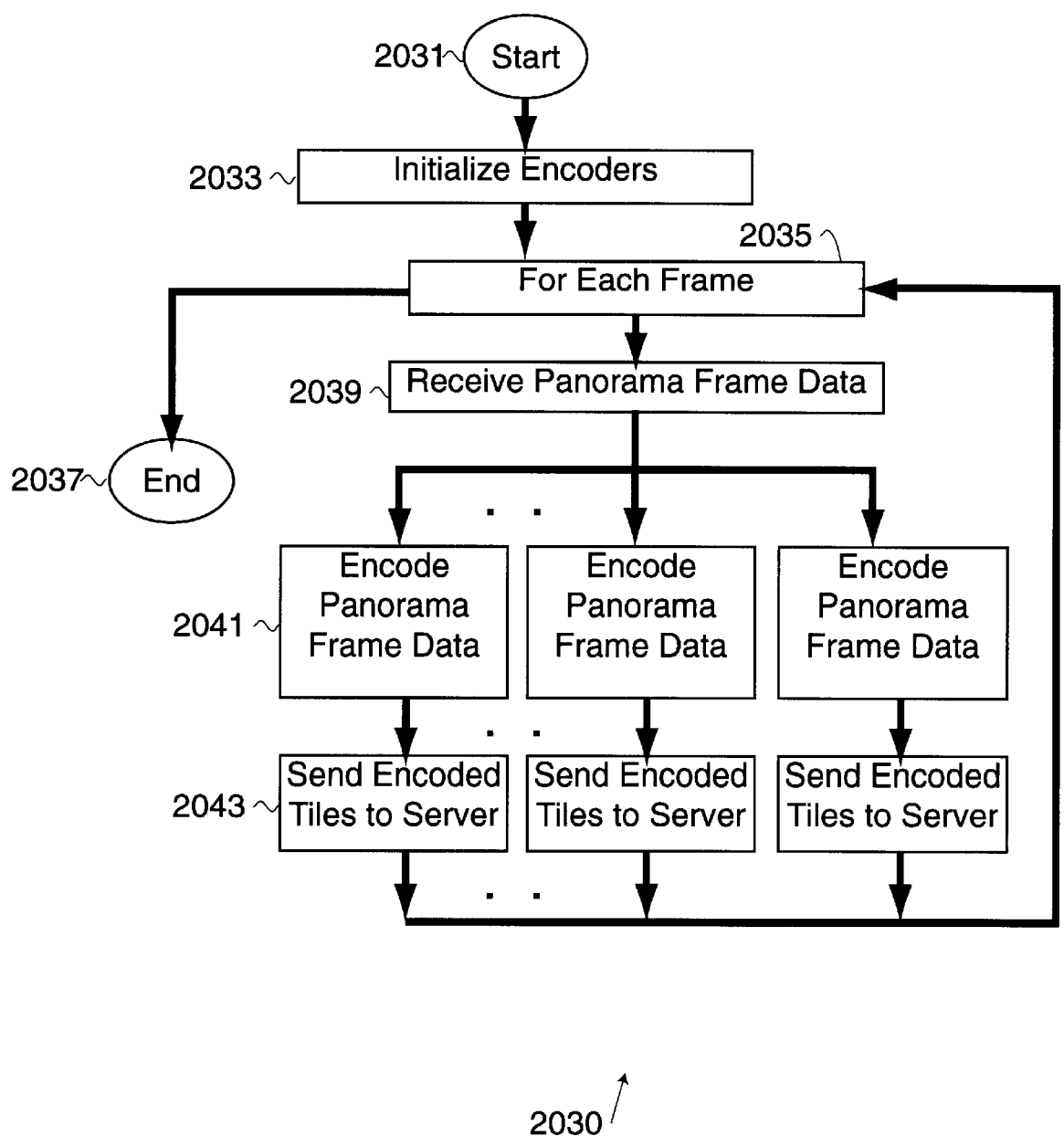
FIG. 20B illustrates a process of encoding tiles from a frame in accordance with a preferred embodiment.

FIG. 20B illustrates an encoding process 2030 for encoding creating tiled tiers of panoramic frames. The encoding process 2030 starts at a 'start' terminal 2031 and continues to an 'initialization' step 2033 that initializes each of the encoders in the encoder array 1609 to provide the tier and tile characteristics according to the availability information for the panorama. An 'iteration' step 2035 determines when all the frames from a moving panorama image have been encoded. After all the frames have been encoded the encoding process 2030 completes through the 'end' terminal 2037. If additional frames exist in the panorama, the encoding process 2030 continues to a 'receive panorama frame data' step 2039 that receives a frame of the panoramic image from an image source such as a video camera, computer generated raster, or other image data source. Once the frame is received, the encoding process 2030 continues to an 'encode frame data' step 2041.

The 'encode frame data' step 2041 provides processing for each tile in each tier. One preferred embodiment simultaneously processes each portion of the frame to generate the tiles in parallel. Other embodiments can assign multiple tiles to a specific encoder. Thus, 24 encoders are used to encode a panorama with three-tiers and eight tiles per tier. Other tier/tile combinations will be subsequently described with respect to FIG. 22.

The encoder array 1609 can be configured to provide different levels of quality for each encoded tile. These quality parameters include the amount of compression, the frame rate, the view size and the color depth for each pixel in the tile. The color depth represents the number of bits per pixel that represent the color of the pixel (including monochrome pixels and black & white pixels).

A 'send encoded tiles' step 2043 sends the data for each tile to the server computer 1607 using a high speed communications link (for example, a computer data bus, a high-speed network link, or other high-speed communications) where it is stored in the server's memory according to the availability information by the 'receive encodings for frame' procedure 2009 of FIG. 20A.

One skilled in the art will understand that the encoder array 1609 can have its own memory for storing the tiles prior to sending the tiles to the server computer 1607.

Figure 21:
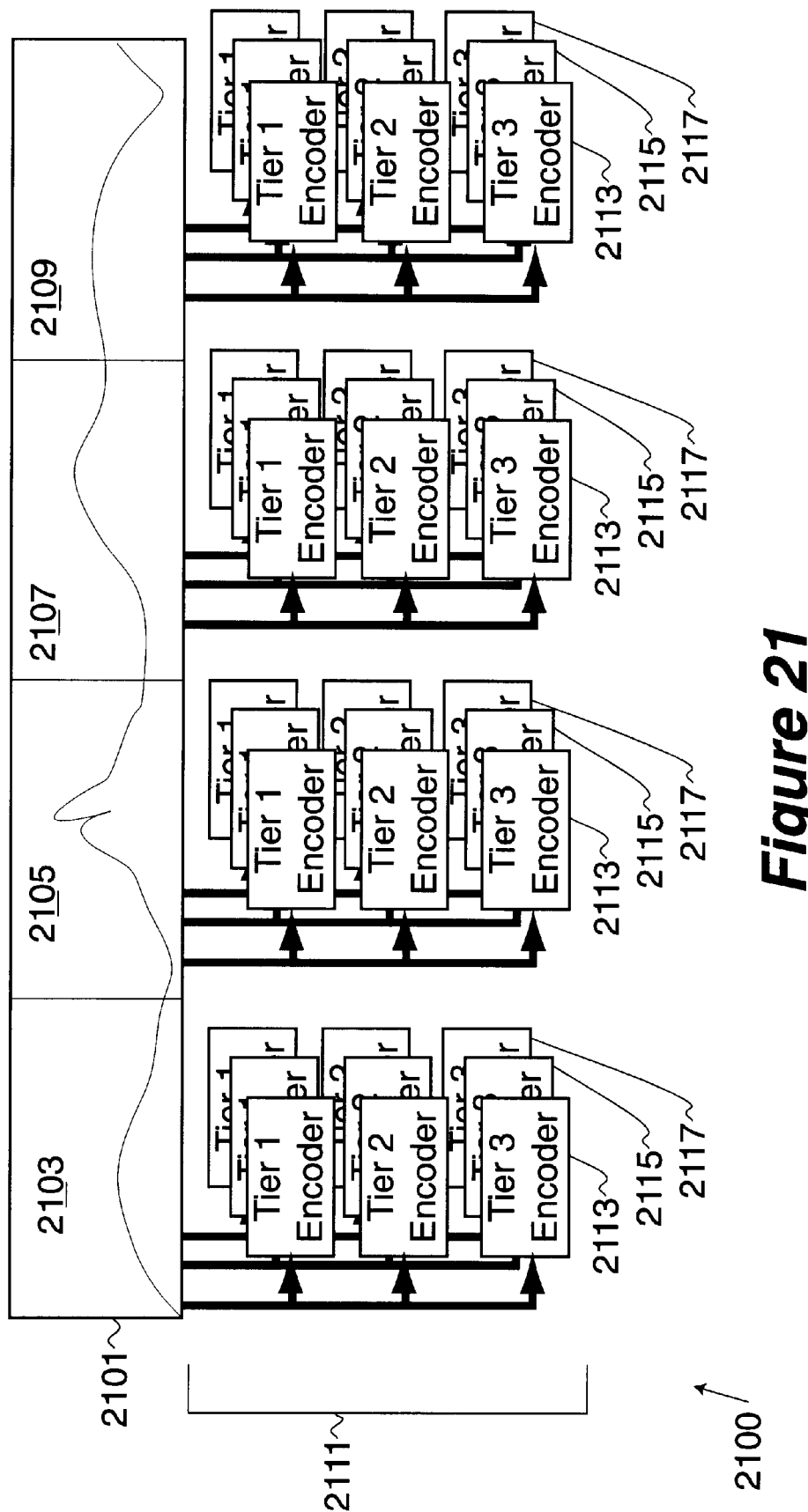
FIG. 21 illustrates application of an encoder array to a panorama in accordance with a preferred embodiment.

FIG. 21 illustrates an application of an encoder array to a panorama 2100 that illustrates how an electronic panorama image 2101 (that includes a first portion 2103, a second portion 2105, a third portion 2107, and a fourth portion 2109) is encoded by an encoder array 2111 in one preferred embodiment.

The electronic panorama image 2101 can be portioned in other ways than indicated. This includes ways where the portions are of differing sizes and/or where the portions overlap. In addition, the portions need not cover the entire height of the panorama but can be a single tile as has been previously discussed. In this preferred embodiment, the encoder array 2111 has three tiers and three groups: a first group of encoders 2113, a second group of encoders 2115, and a third group of encoders 2117. Other preferred embodiments organize the encoder array differently. These embodiments can include more or less encoders, more or less tiers, and/or more or less groups of tiers.

One preferred embodiment of the encoder array consists of only the first group of encoders 2113. This encoder array has a tier 1 encoder for each of portion 2103, 2105, 2107, 2109 of the electronic panorama image 2101 that encodes a high-quality version of their respective portions. The tier 2 encoders encode an intermediate-quality version of their respective portions. The tier 3 encoders encode a reduced-quality version of their respective portions. Thus, in this embodiment, the first group of encoders 2113 generates tiered encodings for each of the portions of the panorama. These encodings are sent to the server for each frame of the panorama. The server then distributes the encodings to the client computers according to their respective tile subscriptions.

Another preferred embodiment includes the second group of encoders 2115 and the third group of encoders 2117. These encoders generate tiers that have different quality characteristics from the first group of encoders 2113.

One skilled in the art will understand that a client computer (for example, the first client computer 1603) can receive information about each generated tile in every tier. Thus, the client computer can subscribe to tiles from any tier to receive data that can be used to provide the desired quality presentation while still providing responsive pan capability.

A binary tree structure can be used to represent the tiers and tiles. One skilled in the art will understand that many other data structures in memory can also be used to organize the tiles.

One preferred approach for organizing the tiers and tiles is to create a tier set that has characteristics suitable for a particular available bandwidth. Thus, a client can select the tier set that is optimized for the available bandwidth between the server and the client.

Figure 22:
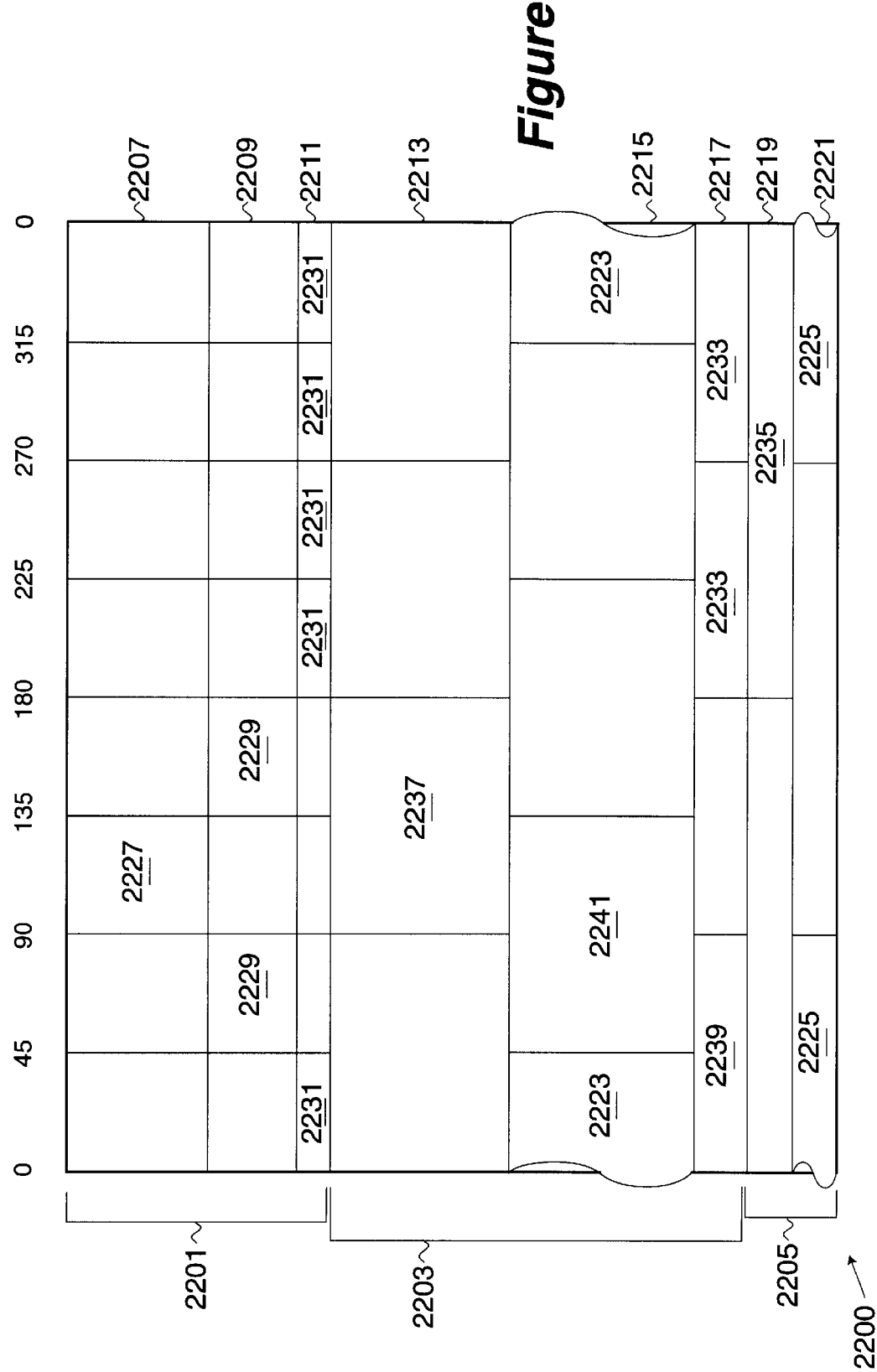
FIG. 22 graphical representation of one example tiling strategy that can be used with a preferred embodiment.

FIG. 22 illustrates an example tiling strategy 2200 using multiple groups of tiers, overlapping tiles, and different quality characteristics. The example tiling strategy 2200 includes a first tier set 2201, a second tier set 2203, and a third tier set 2205. The first tier set 2201 includes a high-quality 45-degree tier 2207, an intermediate-quality 45-degree tier 2209, and a 'reduced-quality 45-degree tier' 2211. The second tier set 2203 includes a 'high-quality 90-degree tier' 2213, a 'high-quality 90-degree (offset) tier' 2215, and a 'reduced-quality 90-degree tier' 2217. The third tier set 2205 includes a reduced-quality 180-degree tier 2219 and a reduced-quality 180-degree (offset) tier 2221. A first wrapped tile 2223 and a second wrapped tile 2225 are tiles that wrap around the planar representation of the panorama.

In the illustration of the example tiling strategy 2200, each tier has a number of tiles. The amount of data that is within the tile (and thus, the amount of bandwidth consumed by the transmission of the tile per angular portion of the panorama) is indicated by the height of the tile. Thus, the shorter the tile, the more compressed (and lower quality) is the data in the tile. Thus, the high-quality tile 2227 has less compression with respect to intermediate-quality tiles 2229 that in turn has less compression than low-quality tiles 2231. The data in each tile of a tier can be refreshed at a particular frame rate. However, the frame rate can be different for each tier in the tier set (and/or different for each tile). In particular, each tier generally has quality characteristics that are different from every other tier. Tiles from multiple tiers (in different tier sets) can be subscribed-to as desired.

One skilled in the art will understand that multiple tier sets need not be included in the tiling strategy and that a binary tree data structure or other data structures can represent a tiling strategy.

In one preferred embodiment, the data in each tile indicated in the example tiling strategy 2200 is provided by a single encoder of the encoder array 1609. Other preferred embodiments share the encoder among multiple tiles so long as the frame rate requirements are met for encoding the tiles.

The tiers in each set can be related to provide a unified compression/quality schema that is often optimized for a particular bandwidth. For example, the tiers in the first tier set 2201 provide three levels of quality corresponding to the three tiers. Conversely the tiers in the second tier set 2203 consist of two high-quality tiers (the 'high-quality 90-degree tier' 2213 and the 'high-quality 90-degree (offset) tier' 2215) having overlapping tiles and the 'reduced-quality 90-degree tier' 2217. The tiles in the third tier set 2205 consist of the reduced-quality 180-degree tier 2219 and the reduced-quality 180-degree (offset) tier 2221. One skilled in the art will understand that here are many different possibilities for the tiling and tier strategy other than that illustrated by the example tiling strategy 2200. One preferred embodiment uses a binary tree structure for each tier set. Yet another preferred embodiment uses a plurality of tier sets similar to the first tier set 2201 but each tier set being optimized for use with a particular bandwidth.

The client computer determines which tiles to select based on the availability information. The availability information specifies the available tile and tier information. The client computer then subscribes to the appropriate tiles responsive to the desired quality of the presentation and the available bandwidth. The availability information can include the tile information, the tier information, the compression information, and/or other information used to define the tiles available to the client computer.

The client computer receives the availability information at the 'receive availability information' procedure 1805 described with respect to FIG. 18. If the client computer wants the example tile subscription 1900 illustrated in FIG. 19 using the availability information for the example tiling strategy 2200, the client computer would subscribe to the high-quality tile 2227 to correspond to the tier-1 tile 1909, the intermediate-quality tiles 2229 to correspond to the tier-2 tiles 1907, 1911, and the low-quality tiles 2231 to correspond to the tier-3 tiles 1905, 1913, 1915, 1917, 1919. One skilled in the art will understand that this is but one example of how the client computer would subscribe to tiles for presentation.

Another possible subscription, for example, is to subscribe to a high-quality tile 2237, low-quality tiles 2233 (or a 'low-quality tile' 2235) along with a 'low-quality tile' 2239. Yet another possible subscription is to subscribe to the high-quality tile 2237, the low-quality tiles 2233 (or the 'low-quality tile' 2235) and a 'high-quality tile' 2241 thus allowing for extending high-quality pan operations for pans moving past 90 degrees toward 45 degrees.

The 'adjust subscription for quality' decision procedure 1815 (briefly discussed with respect to FIG. 18) can dynamically adjust the tile subscription based on the history of the viewpoint movement. For example if the viewpoint has not changed over some period of time, the 'adjust subscription for quality' decision procedure 1815 can unsubscribe from the lower-quality tiles that have not been used to present the view (thus making more bandwidth available) and can subscribe to tiles that will improve the quality of the view at the expense of the ability to smoothly pan through the panorama. If the viewpoint starts to change, the 'adjust subscription for quality' decision procedure 1815 can again subscribe to the lower-quality tiles to restore the pan capability.

One skilled in the art will understand that the example tiling strategy 2200 can provide different quality tiles optimized for different quality characteristics and that the 'adjust subscription for quality' decision procedure 1815 can dynamically select tiles to best meet the changing needs, use, and operating constraints to present the highest possible quality view into the panorama.

Figure 23:
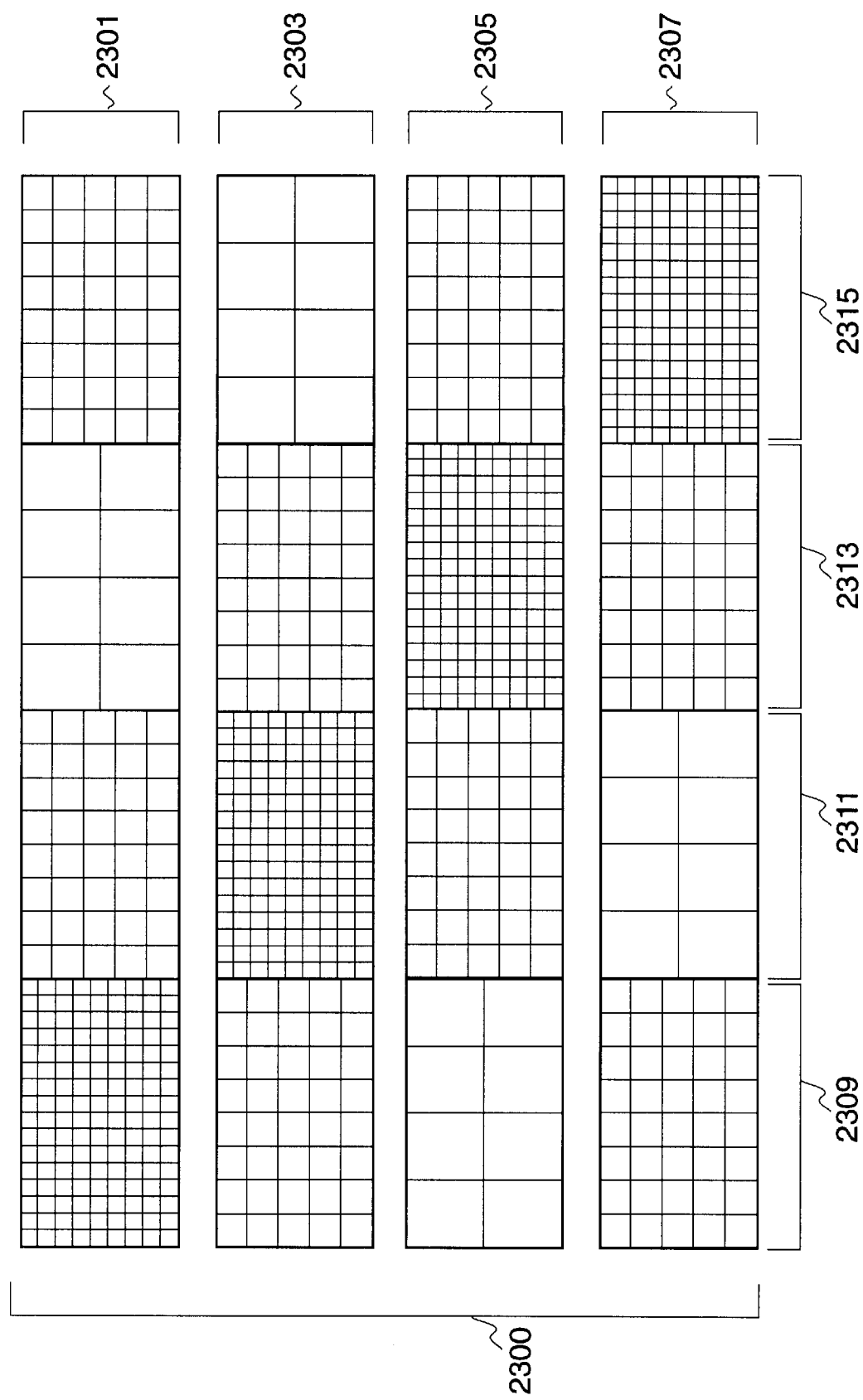
FIG. 23 graphical representation of a variable-quality encoding tier strategy that can be used with a preferred embodiment.

FIG. 23 illustrates a distributed-quality encoding tier strategy 2300 that can be used to simplify the subscription process in the client computer. The distributed-quality encoding tier strategy 2300 provides another method for utilizing the available bandwidth between the server and client computers. In this embodiment, the panorama is not partitioned into multiple tiles. Instead, each tile contains data for the entire panorama. Each tile is available for subscription by the client computer. Each of the tiles is encoded such that the quality of the encoded data in the tile is a function of the angular distance the encoded data is from a viewpoint. Thus, for example, one tile uses a high-quality data encoding from 0 degrees to 90 degrees; a medium-quality data encoding from 90 to 180 degrees and from 0 to −90 degrees; and a low-quality data encoding from 180 to 270 degrees. Using this approach, the client selects a particular tile responsive to the client's viewport. As the viewport changes, the client subscribes to a different tile that has the high-quality data encoding at the changed viewpoint.

FIG. 23 graphically indicates the distributed-quality encoding tier strategy 2300 that (in this example) includes four different tiles of the panorama (a first tile 2301, a second tile 2303, a third tile 2305, and a fourth tile 2307). Each of these tiles contains data that represents the panorama at the same time. Each of these tiles is encoded using a distributed quality encoding such that the encoding for the tile is distributed over the tile. Thus, different portions of the tiles have its data encoded for high-, medium- and low-quality. For example, assume that the tiles are separated into four quadrants of 90 degrees (a first portion 2309, a second portion 2311, a third portion 2313 and a fourth portion 2315). Looking now at the portions in the tiles, notice that the first portion 2309 of the first tile 2301 is the high-quality encoded data (as indicated by the dense cross-hatch pattern). If the first portion 2309 represents quadrant 0–90 degrees, then the data in the adjacent quadrants (the second portion 2311 and the fourth portion 2315) could be encoded to medium-quality and the data in the third portion 2313 (representing the data directly behind the viewpoint) can be encoded to low-quality. Thus, by receiving the selected tile the client receives portions of the panorama as high-quality, medium-quality and low-quality data without a need to subscribe to multiple tiles. This simplifies the subscription process within the client computer.

One skilled in the art will understand that some embodiments do not implement a full 360 degree arc of the panorama.

Each of the other tiles has the high-quality encoded data in a different portion of the tile. Thus, the client computer is able to display high-quality images by selecting which tile to receive responsive to the specified viewpoint. In addition, each set of tiles can be optimized for use with a particular bandwidth.

One skilled in the art will understand that the tiles can use portions having different characteristics than those shown in FIG. 23. In particular, the portions can extend for more or less than the 90 degrees shown; need not cover the entire vertical extent of the panorama, nor do the portions need to cover the same angular area as any other portion. Such a one also will understand that the high-quality portions of the different data encodings of the panorama can overlap.

Some of the advantages of the invention as embodied by the described embodiments are:

Bandwidth usage is maximized to provide the best quality view into the panorama based on the past and/or predicted movement of the viewpoint.

Pan operations are not delayed due to missing tiles.

Pan operations are much more likely to generate views using high-quality tiles.

Tier sets can be configured for use at a specified bandwidth between the client and server computers.

The use of tier sets that use distributed quality encodings simplifies the selection mechanism within the client and is very efficient for limited size presentations.

One skilled in the art will understand that many of the processes described herein can be implemented differently than described. In particular, procedure functions and procedure ordering can often be modified without departing from the scope of the invention. Such a one will also understand that these embodiments are also applicable to still panoramas and the invention is not restricted to motion panoramas.

The foregoing has described methods and apparatuses for electronically distributing motion panoramic images. It is contemplated that changes and modifications may be made by one of ordinary skill in the art to the materials and arrangements of elements of the present invention without departing from the scope of the invention.

What is claimed is:

1. A computer controlled method for presenting a view into a motion panoramic image, said method including steps of:

obtaining availability information related to said motion panoramic image, said availability information including tier information;

determining a viewpoint into said motion panoramic image, said viewpoint defining said view;

receiving a frame of said motion panoramic image;

simultaneously encoding a plurality of portions of said frame into a plurality of encoded portions in accordance with said availability information;

providing said plurality of encoded portions responsive to a selection of said availability information; and presenting said view responsive to said data.

2. A computer controlled method for presenting a view into a motion panoramic image, said method including steps of:

obtaining availability information related to said motion panoramic image, said availability information including tier information;

determining an available bandwidth for accessing one or more tiles;

determining a viewpoint into said motion panoramic image, said viewpoint defining said view;

accessing said one or more tiles, responsive to said tier information, said viewpoint and said available bandwidth, said one or more tiles containing data used to present said view; and presenting said view responsive to said data.

3. The computer controlled method of claim 2 wherein each of said one or more tiles is encoded at a particular quality for that tile.

4. The computer controlled method of claim 2 wherein each of said one or more tiles is encoded using a distributed quality encoding for that tile.

5. The computer controlled method of claim 2 wherein the step of accessing further includes steps of:

subscribing to said one or more tiles responsive to said viewpoint and said availability information to establish a tile subscription; and receiving said one or more tiles responsive to said tile subscription.

6. The computer controlled method of claim 5 further including steps of:

panning said viewpoint;

detecting that the step of panning was a significant pan of said viewpoint; and changing said tile subscription.

7. The computer controlled method of claim 5 further including steps of:
   detecting that said viewpoint is stable; and
   changing said tile subscription responsive to the step of detecting.

8. The computer controlled method of claim 5 further including steps of:
   detecting that said viewpoint is substantially constant over a specified period; and
   changing said tile subscription to increase a quality of said view as presented.

9. The computer controlled method of claim 8 wherein said quality is selected from the set consisting of presented resolution, field of view, view size, frame rate, compression, and color depth.

10. The computer controlled method of claim 2 wherein said tier information includes tile information.

11. The computer controlled method of claim 2 wherein said tier information includes compression information.

12. The computer controlled method of claim 5 wherein the step of obtaining said availability information further includes accessing a server computer.

13. The computer controlled method of claim 12 wherein said server computer performs steps of:
   sending said availability information;
   receiving said tile subscription; and
   sending said one or more tiles responsive to said tile subscription.

14. The computer controlled method of claim 2 wherein the step of obtaining includes accessing information from a computer readable media.

15. A computer controlled method for encoding a motion panoramic image, said method including steps of:
   receiving a frame of said motion panoramic image;
   simultaneously encoding a plurality of portions of said frame into a plurality of encoded portions in accordance with availability information; and
   providing said plurality of encoded portions responsive to a selection of said availability information.

16. The computer controlled method of claim 15 wherein said availability information includes tier information.

17. The computer controlled method of claim 15 further comprising storing said plurality of encoded portions in a memory in accordance with said availability information.

18. The computer controlled method of claim 15 wherein said availability information includes tile information.

19. The computer controlled method of claim 15 further including a step of repeating the steps of receiving, of simultaneously encoding and of providing.

20. The computer controlled method of claim 15 further including a step of sending one or more of said plurality of encoded portions to a server computer.

21. The computer controlled method of claim 15 wherein said availability information represents a data structure in memory having a plurality of tiers.

22. The computer controlled method of claim 21 wherein each of said plurality of tiers includes one or more tiles, each of said one or more tiles referencing data encoded respective to a quality.

23. The computer controlled method of claim 22 wherein said quality is selected from the set consisting of presented resolution, field of view, view size, frame rate, compression, and color depth.

24. The computer controlled method of claim 22 wherein at least one of said plurality of tiers is respectively associated with a tier quality.

25. The computer controlled method of claim 22 wherein at least one of said one or more tiles is respectively associated with a tile quality.

26. The computer controlled method of claim 15 wherein the step of simultaneously encoding is performed by an encoder array.

27. The computer controlled method of claim 15 wherein said plurality of encoded portions is contained within one or more tiles, each of said one or more tiles including data from a portion of an arc covering at least 270-degrees of said motion panoramic image.

28. The computer controlled method of claim 15 wherein each of said plurality of encoded portions is included with one of said one or more tiles respectively.

29. An apparatus having a central processing unit (CPU) and a memory coupled to said CPU for presenting a view into a motion panoramic image, said apparatus includes:
   a first access mechanism configured to obtain availability information related to said motion panoramic image, said availability information including tier information;
   a bandwidth determination mechanism configured to determine the available bandwidth for accessing one or more tiles;
   a viewpoint determination mechanism configured to determine a viewpoint into said motion panoramic image, said viewpoint defining said view;
   a second access mechanism configured to access said one or more tiles, responsive to the viewpoint determination mechanism, the bandwidth determination mechanism and said tier information, said one or more tiles containing data used to present said view; and
   a presentation mechanism configured to present said view responsive to said data accessed by the second access mechanism.

30. The apparatus of claim 29 wherein each of said one or more tiles is encoded at a particular quality for that tile.

31. The apparatus of claim 29 wherein each of said one or more tiles is encoded using a distributed quality encoding for that tile.

32. The apparatus of claim 29 wherein the second access mechanism further includes:
   a subscription mechanism configured to subscribe to said one or more tiles responsive to said viewpoint and said availability information to establish a tile subscription; and
   a receiver mechanism configured to receive said one or more tiles responsive to said tile subscription determined by the subscription mechanism.

33. The apparatus of claim 32 further including:
   a pan mechanism configured to pan said viewpoint;
   a detection mechanism configured to detect that the pan mechanism performed a significant pan of said viewpoint responsive to the pan mechanism; and
   a subscription modification mechanism configured to change said tile subscription responsive to the detection mechanism.

34. The apparatus of claim 32 further including:
   a stability determination mechanism configured to detect that said viewpoint is stable; and
   a subscription modification mechanism configured to change said tile subscription responsive to the stability determination mechanism.

35. The apparatus of claim 32 further including:
   a detection mechanism configured to detect that said viewpoint is substantially constant over a specified period; and a subscription modification mechanism configured to change said tile subscription to increase a quality of said view as presented, the subscription modification mechanism responsive to the detection mechanism.

36. The apparatus of claim 35 wherein said quality is selected from the set consisting of presented resolution, field of view, view size, frame rate, compression, and color depth.

37. The apparatus of claim 29 wherein said tier information includes tile information.

38. The apparatus of claim 29 wherein said tier information includes compression information.

39. The apparatus of claim 32 wherein the first access mechanism is further configured to access a server computer.

40. he apparatus of claim 39 wherein said server computer includes:
   a first sending mechanism configured to send said availability information;
   a subscription receiver mechanism configured to receive said tile subscription; and
   a second sending mechanism configured to send said one or more tiles responsive to said tile subscription.

41. The apparatus of claim 29 wherein the first access mechanism includes a media reader device configured to access information from a computer readable media.

42. An apparatus having a central processing unit (CPU) and a memory coupled to said CPU for encoding a motion panoramic image, said apparatus includes:
   a frame receiver configured to receive a frame of said motion panoramic image;
   an encoder array configured to simultaneously encode a plurality of portions of said frame received from the frame receiver into a plurality of encoded portions in accordance with availability information; and
   a distribution mechanism configured to provide said plurality of encoded portions responsive to a selection of said availability information.

43. The apparatus of claim 42 wherein said availability information includes tier information.

44. The apparatus of claim 42 further comprising a storage mechanism configured to store said plurality of encoded portions in said memory in accordance with said availability information.

45. The apparatus of claim 42 wherein said availability information includes tile information.

46. The apparatus of claim 42 further including a repetition mechanism configured to repeatedly invoke the frame receiver, the encoder array and the distribution mechanism.

47. The apparatus of claim 42 wherein the encoder array further includes a communication mechanism configured to send one or more of said plurality of encoded portions to a server computer.

48. The apparatus of claim 42 wherein said availability information represents a data structure in memory having a plurality of tiers.

49. The apparatus of claim 48 wherein each of said plurality of tiers includes one or more tiles, each of said one or more tiles referencing data encoded respective to a quality.

50. The apparatus of claim 49 wherein said quality is selected from the set consisting of presented resolution, field of view, view size, frame rate, compression, and color depth.

51. The apparatus of claim 49 wherein at least one of said plurality of tiers is respectively associated with a tier quality.

52. The apparatus of claim 49 wherein at least one of said one or more tiles is respectively associated with a tile quality.

53. The apparatus of claim 42 wherein said plurality of encoded portions is contained within one or more tiles, each of said one or more tiles including data from a portion of an arc covering at least 270-degrees of said motion panoramic image.

54. The apparatus of claim 42 wherein each of said plurality of encoded portions is included with one of said one or more tiles respectively.

55. A computer program product including:
   a computer usable data carrier having computer readable code embodied therein for causing a computer to present a view into a motion panoramic image, said computer readable code including:
      computer readable program code configured to cause said computer to effect a first access mechanism configured to obtain availability information related to said motion panoramic image, said availability information including tier information;
      computer readable program code configured to cause said computer to effect a bandwidth determination mechanism configured to determine the available bandwidth for accessing one or more tiles;
      computer readable program code configured to cause said computer to effect a viewpoint determination mechanism configured to determine a viewpoint into said motion panoramic image, said viewpoint defining said view;
      computer readable program code configured to cause said computer to effect a second access mechanism configured to access said one or more tiles, responsive to the viewpoint determination mechanism, the bandwidth determination mechanism and said tier information, said one or more tiles containing data used to present said view; and
      computer readable program code configured to cause said computer to effect a presentation mechanism configured to present said view responsive to said data accessed by the second access mechanism.

56. The computer program product of claim 55 wherein the computer usable data carrier is a computer readable media.

57. The computer program product of claim 55 wherein the computer usable data carrier is a carrier wave.

58. The computer program product of claim 55 wherein each of said one or more tiles is encoded at a particular quality for that tile.

59. The computer program product of claim 55 wherein each of said one or more tiles is encoded using a distributed quality encoding for that tile.

60. The computer program product of claim 55 wherein the second access mechanism further includes:
   computer readable program code configured to cause said computer to effect a subscription mechanism configured to subscribe to said one or more tiles responsive to said viewpoint and said availability information to establish a tile subscription; and
   computer readable program code configured to cause said computer to effect a receiver mechanism configured to receive said one or more tiles responsive to said tile subscription determined by the subscription mechanism.

61. The computer program product of claim 60 further including:
   computer readable program code configured to cause said computer to effect a pan mechanism configured to pan said viewpoint;
   computer readable program code configured to cause said computer to effect a detection mechanism configured to detect that the pan mechanism performed a significant pan of said viewpoint responsive to the pan mechanism; and computer readable program code configured to cause said computer to effect a subscription modification mechanism configured to change said tile subscription responsive to the detection mechanism.

62. The computer program product of claim 60 further including:

computer readable program code configured to cause said computer to effect a stability determination mechanism configured to detect that said viewpoint is stable; and computer readable program code configured to cause said computer to effect a subscription modification mechanism configured to change said tile subscription responsive to the stability determination mechanism.

63. The computer program product of claim 60 further including:

computer readable program code configured to cause said computer to effect a detection mechanism configured to detect that said viewpoint is substantially constant over a specified period; and computer readable program code configured to cause said computer to effect a subscription modification mechanism configured to change said tile subscription to increase a quality of said view as presented, the subscription modification mechanism responsive to the detection mechanism.

64. The computer program product of claim 63 wherein said quality is selected from the set consisting of presented resolution, field of view, view size, frame rate, compression, and color depth.

65. The computer program product of claim 60 wherein the first access mechanism further includes computer readable program code configured to cause said computer to access a server computer.

66. A computer program product including:

a computer usable data carrier having computer readable code embodied therein for causing a computer to encode a motion panoramic image, said computer readable code including:

computer readable program code configured to cause said computer to effect a frame receiver configured to receive a frame of said motion panoramic image;

computer readable program code configured to cause said computer to effect an encoder array configured to simultaneously encode a plurality of portions of said frame received from the frame receiver into a plurality of encoded portions in accordance with availability information; and computer readable program code configured to cause said computer to effect a distribution mechanism configured to provide said plurality of encoded portions responsive to a selection of said availability information.

67. The computer program product of claim 66 wherein the computer usable data carrier is a computer readable media.

68. The computer program product of claim 66 wherein the computer usable data carrier is a carrier wave.

69. The computer program product of claim 66 wherein said availability information includes tier information.

70. The computer program product of claim 66 further comprising computer readable program code configured to cause said computer to effect a storage mechanism configured to store said plurality of encoded portions in said memory in accordance with said availability information.

71. The computer program product of claim 66 wherein said availability information includes tile information.

72. The computer program product of claim 66 further including computer readable program code configured to cause said computer to effect a repetition mechanism configured to repeatedly invoke the frame receiver, the encoder array and the distribution mechanism.

73. The computer program product of claim 66 wherein the encoder array further includes computer readable program code configured to cause said computer to effect a communication mechanism configured to send one or more of said plurality of encoded portions to a server computer.

74. The computer program product of claim 66 wherein said availability information represents a data structure in memory having a plurality of tiers.

75. The computer program product of claim 74 wherein each of said plurality of tiers includes one or more tiles, each of said one or more tiles referencing data encoded respective to a quality.

76. The computer program product of claim 75 wherein said quality is selected from the set consisting of presented resolution, field of view, view size, frame rate, compression, and color depth.

77. The computer program product of claim 75 wherein at least one of said plurality of tiers is respectively associated with a tier quality.

78. The computer program product of claim 75 wherein at least one of said one or more tiles is respectively associated with a tile quality.

79. The computer program product of claim 66 wherein said plurality of encoded portions is contained within one or more tiles, each of said one or more tiles including data from a portion of an arc covering at least 270-degrees of said motion panoramic image.

80. The computer program product of claim 66 wherein each of said plurality of encoded portions is included with one of said one or more tiles respectively.

* * * * *